United States Patent
Li et al.

(10) Patent No.: US 9,955,410 B2
(45) Date of Patent: Apr. 24, 2018

(54) METHOD, APPARATUS, AND SYSTEM FOR COLLECTING INFORMATION ABOUT WIRELESS LOCAL AREA NETWORK ACCESS POINT

(71) Applicant: Huawei Technologies Co., Ltd., Shenzhen, Guangdong (CN)

(72) Inventors: Yingzhe Li, Shanghai (CN); Hongzhuo Zhang, Shanghai (CN); Xiaodong Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 14/793,482

(22) Filed: Jul. 7, 2015

(65) Prior Publication Data

US 2015/0312850 A1    Oct. 29, 2015

Related U.S. Application Data

(63) Continuation of application No. PCT/CN2013/070176, filed on Jan. 7, 2013.

(51) Int. Cl.
*H04W 4/00*    (2009.01)
*H04W 48/16*    (2009.01)
(Continued)

(52) U.S. Cl.
CPC ........... *H04W 48/16* (2013.01); *H04W 24/00* (2013.01); *H04W 24/10* (2013.01);
(Continued)

(58) Field of Classification Search
CPC .............................. H04W 48/16; H04W 24/10
(Continued)

(56) References Cited

U.S. PATENT DOCUMENTS 9,693,334 B2 *  6/2017  Chang ................. H04W 64/003
2008/0014957 A1  1/2008  Ore
(Continued)

FOREIGN PATENT DOCUMENTS

CN    1852615 A    10/2006
CN   102202284 A    9/2011
(Continued)

OTHER PUBLICATIONS

"3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Teast (MDT); Overall description; Stage 2 (Release 10)", 3GPP TS 37.320 V2.0.0, Nov. 2010, 18 pages.
(Continued)

*Primary Examiner* — Farah Faroul

(57) ABSTRACT

A method, an apparatus, and a system for collecting information about a wireless local area network (WLAN) access point (AP). The method specifically includes: a user equipment (UE) receives WLAN AP request information from a base station in a Minimization of Drive Tests (MDT) measurement configuration process, collects WLAN AP information according to the WLAN AP request information, and sends the WLAN AP information to the base station, wherein the WLAN AP request information is used to request the UE to report WLAN AP information. By using an MDT measurement configuration process, a UE may collect and report WLAN AP information based on architecture of a mobile communications network. In this way, WLAN AP information can be conveniently collected.

16 Claims, 5 Drawing Sheets

(51) Int. Cl.
*H04W 24/10* (2009.01)
*H04W 24/00* (2009.01)
*H04W 76/04* (2009.01)
*H04W 64/00* (2009.01)
*H04W 84/12* (2009.01)

(52) U.S. Cl.
CPC .......... *H04W 76/045* (2013.01); *H04W 64/00* (2013.01); *H04W 84/12* (2013.01)

(58) Field of Classification Search
USPC .................................................. 370/252, 328
See application file for complete search history.

(56) References Cited

U.S. PATENT DOCUMENTS

| | | |
|---|---|---|
| 2009/0036132 A1 | 2/2009 | Liu et al. |
| 2011/0257923 A1 | 10/2011 | Boulton |
| 2011/0287793 A1* | 11/2011 | Tenny .................. H04W 24/10 455/507 |
| 2011/0319115 A1* | 12/2011 | Racz ..................... H04W 24/10 455/514 |
| 2012/0064886 A1* | 3/2012 | Kim ...................... H04W 24/04 455/423 |
| 2012/0088457 A1* | 4/2012 | Johansson ............. H04W 24/10 455/67.11 |
| 2012/0094660 A1* | 4/2012 | Radulescu ............ H04W 24/10 455/434 |
| 2012/0106370 A1* | 5/2012 | Radulescu ........ H04W 36/0083 370/252 |
| 2012/0276897 A1* | 11/2012 | Kwon .................. H04B 1/1027 455/423 |
| 2012/0309404 A1* | 12/2012 | Suzuki ................. H04W 24/10 455/450 |
| 2012/0329402 A1* | 12/2012 | Ren ...................... H04W 24/10 455/67.11 |
| 2013/0053017 A1* | 2/2013 | Chang .................. H04W 24/10 455/422.1 |
| 2013/0084910 A1* | 4/2013 | Suzuki .................. H04W 24/02 455/515 |
| 2013/0115970 A1 | 5/2013 | Hapsari et al. |
| 2013/0189970 A1 | 7/2013 | Fukuta |
| 2013/0208616 A1* | 8/2013 | Thiruvenkatachari ..................... H04W 24/10 370/252 |
| 2014/0064132 A1 | 3/2014 | Liu et al. |
| 2014/0220963 A1* | 8/2014 | Jung ..................... H04W 48/16 455/422.1 |
| 2014/0248868 A1* | 9/2014 | Wang .................... H04W 24/10 455/422.1 |
| 2014/0287694 A1* | 9/2014 | Kim ...................... H04W 64/00 455/67.13 |
| 2015/0163745 A1* | 6/2015 | Kim .................. H04W 52/0235 370/311 |
| 2015/0215799 A1* | 7/2015 | Kazmi .................. H04W 24/08 370/252 |
| 2015/0304893 A1* | 10/2015 | Nylander .............. H04W 36/14 370/338 |
| 2016/0080958 A1* | 3/2016 | Rinne ................... H04W 24/10 370/338 |

FOREIGN PATENT DOCUMENTS

| | | |
|---|---|---|
| CN | 102547564 A | 7/2012 |
| EP | 2 219 413 A1 | 8/2010 |
| JP | 2008-306240 A | 12/2008 |
| JP | 2010-127850 A | 6/2010 |
| JP | 2011238990 A | 11/2011 |
| WO | WO 2012/046853 A1 | 4/2012 |

OTHER PUBLICATIONS

"Consideration on WLAN measurement for the LTE/WLAN aggregation and interworking enhancement", 3GPP TSG-RAN WG2 meeting #91, Aug. 24-28, 2015, 8 pages.

* cited by examiner

METHOD, APPARATUS, AND SYSTEM FOR COLLECTING INFORMATION ABOUT WIRELESS LOCAL AREA NETWORK ACCESS POINT

CROSS-REFERENCE TO RELATED APPLICATIONS

This application is a continuation of International Application No. PCT/CN2013/070176, filed on Jan. 7, 2013, which is hereby incorporated by reference in its entirety.

TECHNICAL FIELD

The present invention relates to the field of wireless communications technologies, and in particular, to a method, an apparatus, and a system for collecting information about a wireless local area network access point.

BACKGROUND

A wireless local area network (wireless local area network, WLAN) is a network system established in a wireless manner. By searching for and connecting to an access point (access point, AP) on a WLAN, a user equipment (user equipment, UE) that supports access to the WLAN may enjoy a broadband Internet service conveniently. Currently, in areas with a large population, such as an office building, a business center, and a school, a relatively large number of WLAN APs have been deployed for user access in some enterprises or schools.

In recent years, as mobile data traffic increases sharply, both a bandwidth and a speed of a mobile communications network face increasing challenges. To ease data traffic load of an existing mobile communications network, a telecommunications operator also starts to deploy a large number of WLAN APs progressively. How to optimize coverage of a wireless local area network and a mobile communications network and how to implement convergence and interworking between the wireless local area network and the mobile communications network are becoming a hot topic of technical researches and have great commercial potential. Convenient and quick collection of information about a deployed WLAN AP has important meaning for the optimization of WLAN coverage.

In the prior art, an application developer has already developed an application for collecting WLAN AP information. When a smart phone runs the application, information about a nearby WLAN AP is collected, and the collected WLAN AP information is uploaded to a server of the application developer for other users to share and use. However, this method requires that a user should install the specific application in the user's phone, and the collected WLAN AP information is transparent and invisible to a network provided by a telecommunications operator and cannot be used by the telecommunications operator. Currently, a technical solution for collecting WLAN AP information based on architecture of a mobile communications network has not been found yet.

SUMMARY

Embodiments of the present invention provide a method, an apparatus, and a system for collecting information about a wireless local area network WLAN access point AP, which may conveniently collect information about the WLAN AP based on architecture of a mobile communications network.

The embodiments of the present invention can be specifically implemented by using the following technical solutions:

In a first aspect, a method for collecting information about a wireless local area network access point is provided. The method includes:

sending, by a network device, WLAN AP request information to a base station in a Minimization of Drive Tests MDT measurement configuration process, where the WLAN AP request information is used to request a user equipment UE to report WLAN AP information; and receiving, by the network device, the WLAN AP information sent from the base station, where the WLAN AP information is received by the base station from the UE, and the WLAN AP information is collected by the UE according to the WLAN AP request information after the WLAN AP request information sent from the base station is received.

In the method provided in this embodiment of the present invention to collect information about a wireless local area network access point, a UE may collect and report WLAN AP information based on architecture of a mobile communications network and by using an MDT measurement configuration process. In this way, WLAN AP information can be collected conveniently, accurately, and reliably.

With reference to the first aspect, in a first possible implementation manner of the first aspect, the sending, by a network device, WLAN AP request information to a base station in an MDT measurement configuration process includes:

sending, by the network device, an MDT measurement activation message to a base station, where the MDT measurement activation message includes the WLAN AP request information.

With reference to the first possible implementation manner of the first aspect, in a second possible implementation manner of the first aspect, the MDT measurement activation message includes MDT measurement indication information, where the MDT measurement indication information is used to instruct the base station to send a logged measurement configuration message or a radio resource control RRC connection reconfiguration message to a UE, and the logged measurement configuration message or the RRC connection reconfiguration message includes the WLAN AP request information.

With reference to the first aspect or any one of the first to second possible implementation manners of the first aspect, in a third possible implementation manner of the first aspect, the receiving, by the network device, the WLAN AP information sent from the base station includes:

receiving, by the network device, a WLAN AP information record sent from the base station, where the WLAN AP information record includes the WLAN AP information collected by the UE and status information of the UE recorded by the UE when collecting the WLAN AP information.

With reference to the third possible implementation manner of the first aspect, in a fourth possible implementation manner of the first aspect, the receiving, by the network device, a WLAN AP information record sent from the base station includes:

if the base station sends a logged measurement configuration message to a UE, receiving, by the network device, an MDT log sent from the base station, where the MDT log includes the WLAN AP information record; or if the base station sends a RRC connection reconfiguration message to a UE, receiving, by the network device, a measurement report sent from the base station, where the measurement report includes the WLAN AP information record.

With reference to any one of the third to fourth possible implementation manners of the first aspect, in a fifth possible implementation manner of the first aspect, the status information of the UE recorded by the UE when collecting the WLAN AP information includes one or multiple types of the following information:

received signal power for the UE to receive the WLAN AP signal, geographic location information of the UE, or collection time for the UE to collect the WLAN AP information.

With reference to the first aspect or any one of the first to fifth possible implementation manners of the first aspect, in a sixth possible implementation manner of the first aspect, the WLAN AP information collected by the UE includes one or multiple types of the following information:

a media access control MAC address, a service set identifier SSID, an encryption type, a channel number, a protocol used, or a deployer.

With reference to the sixth possible implementation manner of the first aspect, in a seventh possible implementation manner of the first aspect, if the WLAN AP information record includes an MAC address of the WLAN AP, the method further includes:

establishing or updating, by the network device, a WLAN AP information record database according to the WLAN AP information record and by using the MAC address of the WLAN AP included in the WLAN AP information record as a search identifier.

With reference to the seventh possible implementation manner of the first aspect, in an eighth possible implementation manner of the first aspect, when the network device updates a WLAN AP information record database and if the WLAN AP information record does not include the geographic location information of the UE, the method further includes:

determining, by the network device, the geographic location information of the UE according to an established WLAN AP information record database, where the established WLAN AP information record database includes at least one WLAN AP information record.

With reference to the eighth possible implementation manner of the first aspect, in a ninth possible implementation manner of the first aspect, the WLAN AP information record that does not include the geographic location information of the UE is recorded as a first WLAN AP information record, and the UE is a first UE; and the determining, by the network device, the geographic location information of the UE according to an established WLAN AP information record database includes:

searching, by the network device, the established WLAN AP information record database for a second WLAN AP information record by using an MAC address of a WLAN AP included in the first WLAN AP information record as a search identifier, where the second WLAN AP information record includes the MAC address and includes geographic location information of a second UE; and if the second WLAN AP information record exists in the established WLAN AP information record database, determining, by the network device, the geographic location information of the second UE included in the second WLAN AP information record as geographic location information of the first UE.

With reference to the ninth possible implementation manner of the first aspect, in a tenth possible implementation manner of the first aspect, if the network device also receives an MDT measurement result when receiving the first WLAN AP information record, and the MDT measurement result is obtained by the first UE through MDT measurement, the method further includes:

associating, by the network device, the MDT measurement result with the geographic location information of the first UE, where the geographic location information of the first UE is determined by the network device according to the established WLAN AP information record database.

In a second aspect, a method for collecting information about a wireless local area network access point is provided. The method includes:

receiving, by a user equipment UE, WLAN AP request information sent from a base station, where the WLAN AP request information is sent from a network device to the base station in a Minimization of Drive Tests MDT measurement configuration process, and the WLAN AP request information is used to request the UE to report WLAN AP information;

collecting, by the UE, WLAN AP information according to the WLAN AP request information; and sending, by the UE, the WLAN AP information to the base station, so that the base station sends the WLAN AP information to the network device.

In the method for collecting information about a wireless local area network access point provided in this embodiment of the present invention, a UE may collect and report WLAN AP information based on architecture of a mobile communications network and by using an MDT measurement configuration process. In this way, WLAN AP information can be collected conveniently, accurately, and reliably.

With reference to the second aspect, in a first possible implementation manner of the second aspect, the collecting, by the UE, WLAN AP information according to the WLAN AP request information includes:

performing, by the UE, a WLAN search according to the WLAN AP request information and recording information about a specific WLAN AP among searched WLAN APs, where the specific WLAN AP includes a WLAN AP with a specific deployer or a WLAN AP with a specific service set identifier SSID.

With reference to the second aspect or the first possible implementation manner of the second aspect, in a second possible implementation manner of the second aspect, performing, by the UE, a WLAN search according to the WLAN AP request information and recording, so as to collect WLAN AP information further includes:

further recording, by the UE, status information of the UE when collecting the WLAN AP information, so as to obtain a WLAN AP information record, where the WLAN AP information record includes the WLAN AP information collected by the UE and the status information of the UE recorded by the UE when collecting the WLAN AP information; and the sending, by the UE, the WLAN AP information to the base station includes: sending, by the UE, the WLAN AP information record to the base station.

With reference to the second possible implementation manner of the second aspect, in a third possible implementation manner of the second aspect, the receiving, by a UE, WLAN AP request information sent from a base station includes:

receiving, by the UE, a logged measurement configuration message sent from base station, where the logged measurement configuration message includes the WLAN AP request information; and the sending, by the UE, the WLAN AP information record to the base station includes:

sending, by the UE, an MDT log to the base station, where the MDT log includes the WLAN AP information record.

With reference to the second possible implementation manner of the second aspect, in a fourth possible implementation manner of the second aspect, the receiving, by a UE, WLAN AP request information sent from a base station includes:

receiving, by the UE, a radio resource control RRC connection reconfiguration message sent from a base station, where the RRC connection reconfiguration message includes the WLAN AP request information; and the sending, by the UE, the WLAN AP information record to the base station includes:

sending, by the UE, a measurement report to the base station, where the measurement report includes the WLAN AP information record.

With reference to any one of the second to fourth possible implementation manners of the second aspect, in a fifth possible implementation manner of the second aspect, the status information of the UE recorded by the UE when collecting the WLAN AP information includes one or multiple types of the following information:

received signal power for the UE to receive a WLAN AP signal, geographic location information of the UE, or collection time for the UE to collect the WLAN AP information.

With reference to the second aspect or any one of the first to fifth possible implementation manners of the second aspect, in a sixth possible implementation manner of the second aspect, the WLAN AP information collected by the UE includes one or multiple types of the following information:

a media access control MAC address, a service set identifier SSID, an encryption type, a channel number, a protocol used, or a deployer.

In a third aspect, a method for collecting information about a wireless local area network access point is provided. The method includes:

receiving, by a base station, WLAN AP request information sent from a network device in a Minimization of Drive Tests MDT measurement configuration process, where the WLAN AP request information is used to request a user equipment UE to report WLAN AP information;

sending, by the base station, the WLAN AP request information to the UE;

receiving, by the base station, the WLAN AP information sent from the UE, where the WLAN AP information is collected by the UE according to the WLAN AP request information; and sending, by the base station, the WLAN AP information to the network device.

In the method for collecting information about a wireless local area network access point provided in this embodiment of the present invention, a UE may collect and report WLAN AP information based on architecture of a mobile communications network and by using an MDT measurement configuration process. In this way, WLAN AP can be collected conveniently, accurately, and reliably.

With reference to the third aspect, in a first possible implementation manner of the third aspect: the receiving, by a base station, WLAN AP request information sent from a network device in an MDT measurement configuration process includes:

receiving, by the base station, an MDT measurement activation message sent from the network device, where the MDT measurement activation message includes the WLAN AP request information.

With reference to the first possible implementation manner of the third aspect, in a second possible implementation manner of the third aspect, the MDT measurement activation message includes MDT measurement indication information, where the MDT measurement indication information is used to instruct the base station to send a logged measurement configuration message or a radio resource control RRC connection reconfiguration message to a UE, and the logged measurement configuration message or the RRC connection reconfiguration message includes the WLAN AP request information; and the sending, by the base station, the WLAN AP request information to the UE includes:

sending, by the base station, the logged measurement configuration message to the UE according to the MDT measurement indication information; or sending, by the base station, the RRC connection reconfiguration message to the UE according to the MDT measurement indication information.

With reference to the third aspect or any one of the first to second possible implementation manners of the third aspect, in a third possible implementation manner of the third aspect, the receiving, by the base station, the WLAN AP information sent from the UE includes:

receiving, by the base station, a WLAN AP information record sent from the UE, where the WLAN AP information record includes the WLAN AP information collected by the UE and status information of the UE recorded by the UE when collecting the WLAN AP information; and the sending, by the base station, the WLAN AP information to the network device includes:

sending, by the base station, the WLAN AP information record to the network device.

With reference to the third possible implementation manner of the third aspect, in a fourth possible implementation manner of the third aspect, if the base station sends the logged measurement configuration message to the UE according to the MDT measurement indication information, the receiving, by the base station, a WLAN AP information record sent from the UE includes:

receiving, by the base station, an MDT log sent from the UE, where the MDT log includes the WLAN AP information record; and the sending, by the base station, the WLAN AP information record to the network device includes:

sending, by the base station, the MDT log to the network device.

With reference to the third possible implementation manner of the third aspect, in a fifth possible implementation manner of the third aspect, if the base station sends the RRC connection reconfiguration message to the UE according to the MDT measurement indication information, the receiving, by the base station, a WLAN AP information record sent from the UE includes:

receiving, by the base station, a measurement report sent from the UE, where the measurement report includes the WLAN AP information record; and the sending, by the base station, the WLAN AP information to the network device includes:

sending, by the base station, the measurement report to the network device.

With reference to any one of the third to fifth possible implementation manners of the third aspect, in a sixth possible implementation manner of the third aspect, the status information of the UE recorded by the UE when collecting the WLAN AP information includes one or multiple types of the following information:

received signal power for the UE to receive a WLAN AP signal, geographic location information of the UE, or collection time for the UE to collect the WLAN AP information.

With reference to the third aspect or any one of the first to sixth possible implementation manners of the third aspect, in a seventh possible implementation manner of the third aspect, the WLAN AP information collected by the UE includes one or multiple types of the following information:

a media access control MAC address, a service set identifier SSID, an encryption type, a channel number, a protocol used, or a deployer.

In a fourth aspect, a network device is provided, including:

a sending unit, configured to send WLAN AP request information to a base station in a Minimization of Drive Tests MDT measurement configuration process, where the WLAN AP request information is used to request a user equipment UE to report WLAN AP information; and a receiving unit, configured to receive the WLAN AP information sent from the base station, where the WLAN AP information is received by the base station from the UE, and the WLAN AP information is collected by the UE according to the WLAN AP request information after the WLAN AP request information sent from the base station is received.

With the aid of the network device provided in this embodiment of the present invention, a UE may collect and report WLAN AP information based on architecture of a mobile communications network and by using an MDT measurement configuration process. In this way, WLAN AP information can be collected conveniently, accurately, and reliably.

With reference to the fourth aspect, in a first possible implementation manner of the fourth aspect, that the sending unit is configured to send WLAN AP request information to a base station in an MDT measurement configuration process includes the following:

the sending unit is configured to send an MDT measurement activation message to a base station, where the MDT measurement activation message includes the WLAN AP request information.

With reference to the first possible implementation manner of the fourth aspect, in a second possible implementation manner of the fourth aspect, the MDT measurement activation message includes MDT measurement indication information, where the MDT measurement indication information is used to instruct the base station to send a logged measurement configuration message or a radio resource control RRC connection reconfiguration message to a UE, and the logged measurement configuration message or the RRC connection reconfiguration message includes the WLAN AP request information.

With reference to the fourth aspect or any one of the first to second possible implementation manners of the fourth aspect, in a third possible implementation manner of the fourth aspect, that the receiving unit is configured to receive the WLAN AP information sent from the base station includes the following:

the receiving unit is configured to receive a WLAN AP information record sent from the base station, where the WLAN AP information record includes the WLAN AP information collected by the UE and status information of the UE recorded by the UE when collecting the WLAN AP information.

With reference to the third possible implementation manner of the fourth aspect, in a fourth possible implementation manner of the fourth aspect, that the receiving unit is configured to receive a WLAN AP information record sent from the base station includes the following:

the receiving unit is configured to receive an MDT log sent from the base station, where the MDT log includes the WLAN AP information record; or the receiving unit is configured to receive a measurement report sent from the base station, where the measurement report includes the WLAN AP information record.

With reference to any one of the third to fourth possible implementation manners of the fourth aspect, in a fifth possible implementation manner of the fourth aspect, the status information of the UE recorded by the UE when collecting the WLAN AP information includes one or multiple types of the following information:

received signal power for the UE to receive the WLAN AP signal, geographic location information of the UE, or collection time for the UE to collect the WLAN AP information.

With reference to the fourth aspect or any one of the first to fifth possible implementation manners of the fourth aspect, in a sixth possible implementation manner of the fourth aspect, the WLAN AP information collected by the UE includes one or multiple types of the following information:

a media access control MAC address, a service set identifier SSID, an encryption type, a channel number, a protocol used, or a deployer.

With reference to the sixth possible implementation manner of the fourth aspect, in a seventh possible implementation manner of the fourth aspect, the network device further includes:

a processing unit, configured to, when the WLAN AP information record includes an MAC address of the WLAN AP, establish or update a WLAN AP information record database by using the MAC address as a search identifier; and a memory unit, configured to store the WLAN AP information record database.

With reference to the seventh possible implementation manner of the fourth aspect, in an eighth possible implementation manner of the fourth aspect, the processing unit is configured to, if the WLAN AP information record does not include geographic location information of the UE, determine the geographic location information of the UE according to an established WLAN AP information record database when updating the WLAN AP information record database, where the established WLAN AP information record database includes at least one WLAN AP information record.

With reference to the eighth possible implementation manner of the fourth aspect, in a ninth possible implementation manner of the fourth aspect, the WLAN AP information record that does not include the geographic location information of the UE is recorded as a first WLAN AP information record, and the UE is a first UE; and that the processing unit is configured to determine the geographic location information of the UE according to an established WLAN AP information record database includes the following:

the processing unit is configured to: search the established WLAN AP information record database for a second WLAN AP information record by using an MAC address of a WLAN AP included in the first WLAN AP information record as a search identifier, where the second WLAN AP information record includes the MAC address and includes geographic location information of a second UE; and if the second WLAN AP information record exists in the established WLAN AP information record database, determine the geographic location information of the second UE included in the second WLAN AP information record as geographic location information of the first UE.

With reference to the ninth possible implementation manner of the fourth aspect, in a tenth possible implementation manner of the fourth aspect, the processing unit is configured to, if the receiving unit also receives an MDT measurement result when the receiving unit receives the first WLAN AP information record, associate the MDT measurement result with the geographic location information of the first UE, where the geographic location information of the first UE is determined by the location determining unit according to the established WLAN AP information record database, and the MDT measurement result is obtained by the first UE through MDT measurement.

With reference to the fourth aspect or any one of the first to tenth possible implementation manners of the fourth aspect, in an eleventh possible implementation manner of the fourth aspect, the network device is a network management system device, a mobility management entity MME, or a service general packet radio service supporting node SGSN.

In a fifth aspect, a user equipment UE is provided, including:

a receiving unit, configured to receive WLAN AP request information sent from a base station, where the WLAN AP request information is sent from a network device to the base station in a Minimization of Drive Tests MDT measurement configuration process, and the WLAN AP request information is used to request the UE to report WLAN AP information;

a collecting unit, configured to collect WLAN AP information according to the WLAN AP request information; and a sending unit, configured to send the WLAN AP info/nation to the base station, so that the base station sends the WLAN AP information to the network device.

The user equipment UE provided in this embodiment of the present invention may collect and report WLAN AP information, based on architecture of a mobile communications network and by using an MDT measurement configuration process. In this way, WLAN AP information can be collected conveniently, accurately, and reliably.

With reference to the fifth aspect, in a first possible implementation manner of the fifth aspect, that the collecting unit is configured to collect WLAN AP information according to the WLAN AP request information includes the following:

the collecting unit is configured to perform a WLAN search according to the WLAN AP request information and record information about a specific WLAN AP among searched WLAN APs, where the specific WLAN AP includes a WLAN AP with a specific deployer or a WLAN AP with a specific service set identifier SSID.

With reference to the fifth aspect or the first possible implementation manner of the fifth aspect, in a second possible implementation manner of the fifth aspect, the collecting unit is configured to record status information of the UE when collecting the WLAN AP information, so as to obtain a WLAN AP information record, where the WLAN AP information record includes the WLAN AP information collected by the UE and the status information of the UE recorded by the UE when collecting the WLAN AP information; and that the sending unit is configured to send the WLAN AP information to the base station includes the following:

the sending unit is configured to send the WLAN AP information record to the base station.

With reference to the second possible implementation manner of the fifth aspect, in a third possible implementation manner of the fifth aspect, that the receiving unit is configured to receive WLAN AP request information sent from a base station includes the following:

the receiving unit is configured to receive a logged measurement configuration message sent from a base station, where the logged measurement configuration message includes the WLAN AP request information; and that the sending unit is configured to send the WLAN AP information to the base station includes the following:

the sending unit is configured to send an MDT log to the base station, where the MDT log includes the WLAN AP information record.

With reference to the second possible implementation manner of the fifth aspect, in a fourth possible implementation manner of the fifth aspect, that the receiving unit is configured to receive WLAN AP request information sent from a base station includes the following:

the receiving unit is configured to receive a radio resource control RRC connection reconfiguration message sent from a base station, where the RRC connection reconfiguration message includes the WLAN AP request information; and that the sending unit is configured to send the WLAN AP information to the base station includes the following:

the sending unit is configured to send a measurement report to the base station, where the measurement report includes the WLAN AP information.

With reference to any one of the second to fourth possible implementation manners of the fifth aspect, in a fifth possible implementation manner of the fifth aspect, the status information of the UE recorded by the UE when collecting the WLAN AP information includes one or multiple types of the following information:

received signal power for the UE to receive a WLAN AP signal, geographic location information of the UE, or collection time for the UE to collect the WLAN AP information.

With reference to the fifth aspect or any one of the first to fifth possible implementation manners of the fifth aspect, in a sixth possible implementation manner of the fifth aspect, the WLAN AP information collected by the UE includes one or multiple types of the following information:

a media access control MAC address, a service set identifier SSID, an encryption type, a channel number, a protocol used, or a deployer.

In a sixth aspect, a base station is provided, including:

a receiving unit, configured to receive WLAN AP request information sent from a network device in a Minimization of Drive Tests MDT measurement configuration process, where the WLAN AP request information is used to request a user equipment UE to report WLAN AP information; and a sending unit, configured to send the WLAN AP request information to the UE;

the receiving unit is configured to receive the WLAN AP information sent from the UE, where the WLAN AP information is collected by the UE according to the WLAN AP request information; and the sending unit is configured to send the WLAN AP information to the network device.

With the aid of the base station provided in this embodiment of the present invention, a UE may collect and report WLAN AP information based on architecture of a mobile communications network and by using an MDT measurement configuration process. In this way, WLAN AP information can be collected conveniently, accurately, and reliably.

With reference to the sixth aspect, in a first possible implementation manner of the sixth aspect, that the receiving unit is configured to receive WLAN AP request information sent from a network device in an MDT measurement configuration process includes the following:

the receiving unit is configured to receive an MDT measurement activation message, where the MDT measurement activation message includes the WLAN AP request information.

With reference to the first possible implementation manner of the sixth aspect, in a second possible implementation manner of the sixth aspect, the MDT measurement activation message includes MDT measurement indication information, where the MDT measurement indication information is used to instruct the base station to send a logged measurement configuration message or a radio resource control RRC connection reconfiguration message to a UE, and the logged measurement configuration message or the RRC connection reconfiguration message includes the WLAN AP request information.

With reference to the sixth aspect or any one of the first to second possible implementation manners of the sixth aspect, in a third possible implementation manner of the sixth aspect, that the receiving unit is configured to receive the WLAN AP information sent from the UE includes the following:

the receiving unit is configured to receive a WLAN AP information record sent from the UE, where the WLAN AP information record includes the WLAN AP information collected by the UE and status information of the UE recorded by the UE when collecting the WLAN AP information; and that the sending unit is configured to send the WLAN AP information to the network device includes the following:

the sending unit is configured to send the WLAN AP information record to the network device.

With reference to the third possible implementation manner of the sixth aspect, in a fourth possible implementation manner of the sixth aspect, that the sending unit is configured to send the WLAN AP request information to the UE includes the following: the sending unit is configured to send the logged measurement configuration message according to the MDT measurement indication information;

that the receiving unit is configured to receive a WLAN AP information record sent from the UE includes the following: the receiving unit is configured to receive an MDT log sent from the UE, where the MDT log includes the WLAN AP information record; and that the sending unit is configured to send the WLAN AP information record to the network device includes the following: the sending unit is configured to send the MDT log to the network device.

With reference to the third possible implementation manner of the sixth aspect, in a fifth possible implementation manner of the sixth aspect, that the sending unit is configured to send the WLAN AP request information to the UE includes the following: the sending unit is configured to send the RRC connection reconfiguration message according to the MDT measurement indication information;

that the receiving unit is configured to receive a WLAN AP information record sent from the UE includes the following: the receiving unit is configured to receive a measurement report sent from the UE, where the measurement report includes the WLAN AP information record; and that the sending unit is configured to send the WLAN AP information record to the network device includes the following: the sending unit is configured to send the measurement report to the network device.

With reference to any one of the third to fifth possible implementation manners of the sixth aspect, in a sixth possible implementation manner of the sixth aspect, the status information of the UE recorded by the UE when collecting the WLAN AP information includes one or multiple types of the following information:

received signal power for the UE to receive a WLAN AP signal, geographic location information of the UE, or collection time for the UE to collect the WLAN AP information.

With reference to the sixth aspect or any one of the first to sixth possible implementation manners of the sixth aspect, in a seventh possible implementation manner of the sixth aspect, the WLAN AP information collected by the UE includes one or multiple types of the following information:

a media access control MAC address, a service set identifier SSID, an encryption type, a channel number, a protocol used, or a deployer.

In a seventh aspect, a communications system is provided, including:

the network device provided in the fourth aspect or any one of the first to eleventh possible implementation manners of the fourth aspect, the user equipment provided in the fifth aspect or any one of the first to sixth possible implementation manners of the fifth aspect, and the base station provided in the sixth aspect or any one of the first to seventh possible implementation manners of the sixth aspect, where:

the network device is configured to send WLAN AP request information to the base station in a Minimization of Drive Tests MDT measurement configuration process, where the WLAN AP request information is used to request the UE to report WLAN AP information;

the base station is configured to send the WLAN AP request information to the UE;

the UE is configured to collect WLAN AP information according to the WLAN AP request information and report the WLAN AP information to the base station;

the base station is configured to receive the WLAN AP information sent from the UE and send the WLAN AP information to the network device; and the network device is configured to receive the WLAN AP information sent from the base station.

In the communications system provided in this embodiment of the present invention, a UE may collect and report WLAN AP information based on architecture of a mobile communications network and by using an MDT measurement configuration process. In this way, WLAN AP information can be collected conveniently, accurately, and reliably.

DETAILED DESCRIPTION

To make the objectives, technical solutions, and advantages of the present invention more clearly, the following further describes the technical solutions of the present invention in detail with reference to the accompanying drawings and specific embodiments.

Technical solutions provided in embodiments of the present invention may be applied to various mobile communications networks, such as a Universal Mobile Telecommunications (universal mobile telecommunication system, UMTS) System, a general packet radio service (general packet radio service) system, a Long Term Evolution (long term evolution, LTE) system, and a Long Term Evolution Advanced (long term evolution advanced, LTE-A). The terms "network" and "system" may be interchangeable.

In the embodiments of the present invention, a base station (base station, BS) may be a site that communicates with a user equipment (user equipment, UE) or another communications site, such as a relay site. The base station may provide communication coverage for a specific physical area. UEs may be distributed on an entire wireless network, and each UE may be static or mobile. The UE may be called a terminal (terminal), a mobile station (mobile station), a subscriber unit (subscriber unit), a station (station), or the like. The UE may be a cellular phone (cellular phone), a personal digital assistant (personal digital assistant, PDA), a wireless modem (modem), a wireless communications device, a hand-held device (hand-held), a laptop computer (laptop computer), or the like. An access point (access point, AP) on a wireless local area network may also be called a wireless access node, a session node, or an accessor bridge. It may specifically indicate a pure wireless AP, may also indicate a wireless router, or may also indicate another device that is capable of providing access to a wireless local area network in a wireless manner for a UE. In the embodiments of the present invention, a base station works in a mobile communications network, such as a UMTS system and an LTE system, and an access point AP on a wireless local area network works in a wireless local area network.

Figure 1:
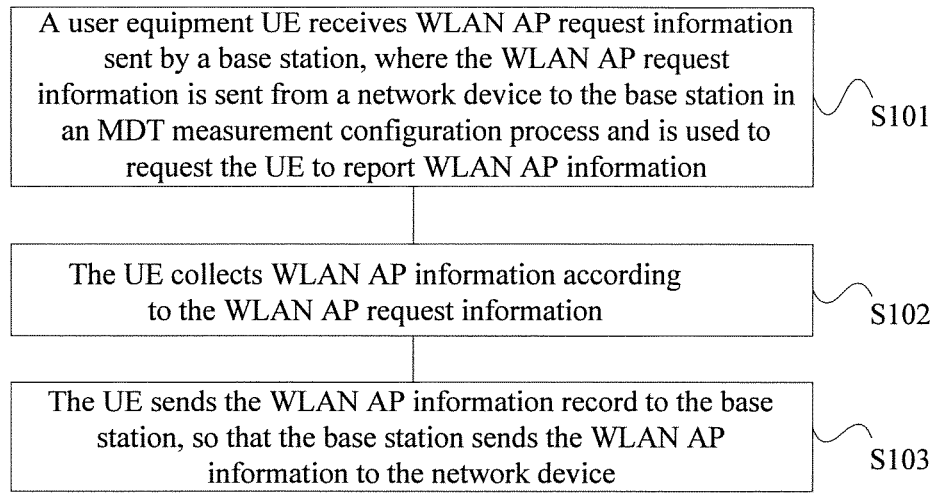
FIG. 1 is a schematic flowchart of a method for collecting information about a wireless local area network access point according to an embodiment of the present invention.

Referring to FIG. 1, a method provided in an embodiment of the present invention to collect information about a wireless local area network access point includes:

Step S101: A user equipment UE receives WLAN AP request information sent from a base station.

The WLAN AP request information is sent from a network device to the base station in a Minimization of Drive Tests MDT measurement configuration process, and the WLAN AP request information is used to request the UE to report WLAN AP information.

A Minimization of Drive Tests MDT (minimization of drive tests, MDT) technology is an innovative drive test technology proposed by the 3rd Generation Partnership Project (3rd generation partnership project, 3GPP) standards organization. MDT measurement configuration is performed on a user equipment UE through a mobile communications network, and the UE performs MDT measurement according to the MDT measurement configuration and reports an MDT measurement result. Because an MDT measurement process requires the involvement of a user equipment UE at the user's discretion, a mobile communications network may perform MDT measurement configuration on a specific UE at the user's discretion. The specific UE may be a predetermined UE that agrees to perform MDT measurement, for example, the specific UE may be a UE that pre-signs with a telecommunications operator an agreement for assent to MDT measurement.

A mobile communications network may send MDT measurement configuration information to a user equipment UE, in order to indicate parameters required by the UE to perform MDT measurement, such as a measurement object, a reporting configuration, a measurement identifier, a quantity configuration, and a measurement gap. After receiving the MDT measurement configuration information, the UE may perform MDT measurement according to the MDT measurement configuration information and reports an MDT measurement result. The MDT measurement result relates to the MDT measurement configuration information and may specifically be received signal code power (received signal code power, RSCP), a received signal strength indicator (received signal strength indicator, RSSI), a chip energy-to-noise power ratio $E_c/N_0$, reference signal received power (reference signal received power, RSRP), reference signal received quality (reference signal received quality, RSRQ), or the like.

Step S102: The UE collects WLAN AP information according to the WLAN AP request information.

After the UE receives the WLAN AP request information, if the UE supports a WLAN access function, the UE may perform a WLAN search so as to collect information about a WLAN AP near the UE. For example, the UE may obtain information about a WLAN AP near the UE by snooping on a broadcast beacon (beacon) periodically sent from the WLAN AP, or by using a probe response (probe response) in active scanning (active scanning).

The WLAN AP information collected by the UE may include one or multiple types of the following information about the WLAN AP: a media access control MAC address, a service set identifier SSID, an encryption type, a channel number, a protocol used, or a deployer. The MAC address, which is also called a hardware address, is 48 bits in length and formed by a 12 hexadecimal digits. Each WLAN AP has a global unique MAC address. The service set identifier SSID may be self-defined by a deployer during WLAN AP deployment. The deployer may be an operator, an enterprise, a school, or a person. The encryption type may be WPA (Wi-Fi Protected Access), WPA2 (Wi-Fi Protected Access 2), or PSK (Pre-shared Key). The protocol used may be the IEEE (Institute of Electrical and Electronics Engineers) 802.11 series of protocols, such as 802.11a, 802.11b, 802.11g, and 802.11n. The channel number is a number of a channel on which the WLAN AP detected by the UE works.

Step S103: The UE sends the WLAN AP information to the base station, so that the base station sends the WLAN AP information to the network device.

In the method for collecting information about a wireless local area network access point provided in the embodiment illustrated in FIG. 1, a UE may collect and report WLAN AP information based on architecture of a mobile communications network and by using an MDT measurement configuration process. In this way, WLAN AP information can be conveniently collected. In addition, because the UE that performs MDT measurement is selectable in the MDT measurement configuration process, the WLAN AP information collected by using the method is also of high accuracy and reliability.

Optionally, the WLAN AP request information in step S101 may be used to request the UE to report information about a specific WLAN AP; in step S102, when collecting WLAN AP information according to the WLAN AP request information, the UE may record information about the specific WLAN AP among searched WLAN APs. The specific WLAN AP includes a WLAN AP with a specific deployer or a WLAN AP with a specific service set identifier SSID.

For example, only information about a WLAN AP deployed by a specific operator is collected, so as to be subsequently used for specifically optimizing coverage of the WLAN network of the operator. For example, if the operator defines a specific SSID, and binds the SSID and the public land mobile network (public land mobile network, PLMN), the operator may also collect only information about the WLAN AP with the specific service set identifier SSID.

Optionally, the UE may further record status information of the UE when collecting the WLAN AP information, so as to obtain a WLAN AP information record. The WLAN AP information record includes the WLAN AP information collected by the UE and the status information of the UE recorded by the UE when collecting the WLAN AP information; and the sending, by the UE, the WLAN AP information to the base station includes: sending, by the UE, the WLAN AP information record to the base station.

The status information of the UE may include one or multiple types of the following information: received signal power for the UE to receive a WLAN AP signal, geographic location information of the UE, or collection time for the UE to collect the WLAN AP information. The received signal power may reflect a distance between the UE and the WLAN AP. Generally, after transmit power of a WLAN AP is determined, the smaller the distance between the UE and the WLAN AP is, the higher the received signal power is. The geographic location information is the geographic location information of the UE when collecting the WLAN AP information. For example, if the UE supports a Global Navigation Satellite System (Global Navigation Satellite System, GNSS) function, the UE may acquire the geographic location information by starting a GNSS device. The collection time is the time for the UE to collect the WLAN AP information. It may be absolute time or relative collection time that is relative to configuration delivery time.

Optionally, the receiving, by a UE, WLAN AP request information sent from a base station in step S101 may include: receiving, by the UE, a logged measurement configuration (Logged Measurement Configuration) message sent from a base station, where the logged measurement configuration message includes the WLAN AP request information; or, receiving, by the UE, a radio resource control (radio resource control, RRC) connection reconfiguration (RRC Connection Reconfiguration) message sent from a base station, where the RRC connection reconfiguration message includes the WLAN AP request information.

When the UE receives a logged measurement configuration message, the UE may use a logged MDT (Logged MDT) measurement mode and the UE may perform MDT measurement in RRC idle state (RRC idle). When the UE receives an RRC connection reconfiguration message, the UE may use an immediate MDT (Immediate MDT) measurement mode and the UE may perform MDT measurement in RRC connected state (RRC connected).

If the UE receives the WLAN AP request information through a logged measurement configuration message, optionally, the performing, by the UE, a WLAN search according to the WLAN AP request information and recording in step S102 may be performed when the UE is in RRC idle state, and the sending, by the UE, the WLAN AP information record to the base station may include: sending, by the UE, an MDT log to the base station, where the MDT log includes the WLAN AP information record; and, before the UE sends an MDT log to the base station, the following may be included: sending, by the UE, an MDT log available message to the base station and receiving, by the UE, an MDT log request message sent from the base station.

If the UE receives the WLAN AP request information through an RRC connection reconfiguration message, optionally, the performing, by the UE, a WLAN search according to the WLAN AP request information and recording in step S102 may be performed when the UE is in RRC connected state, and the sending, by the UE, the WLAN AP information record to the base station may include: sending, by the UE, a measurement report to the base station, where the measurement report includes the WLAN AP information record.

It should be noted that if multiple WLAN APs are found when the UE is performing the WLAN search, the UE may obtain multiple WLAN AP information records at the same time, where the multiple WLAN AP information records correspond to the multiple WLAN APs separately, and the multiple WLAN AP information records may have same geographic location information and collection time.

Figure 2:
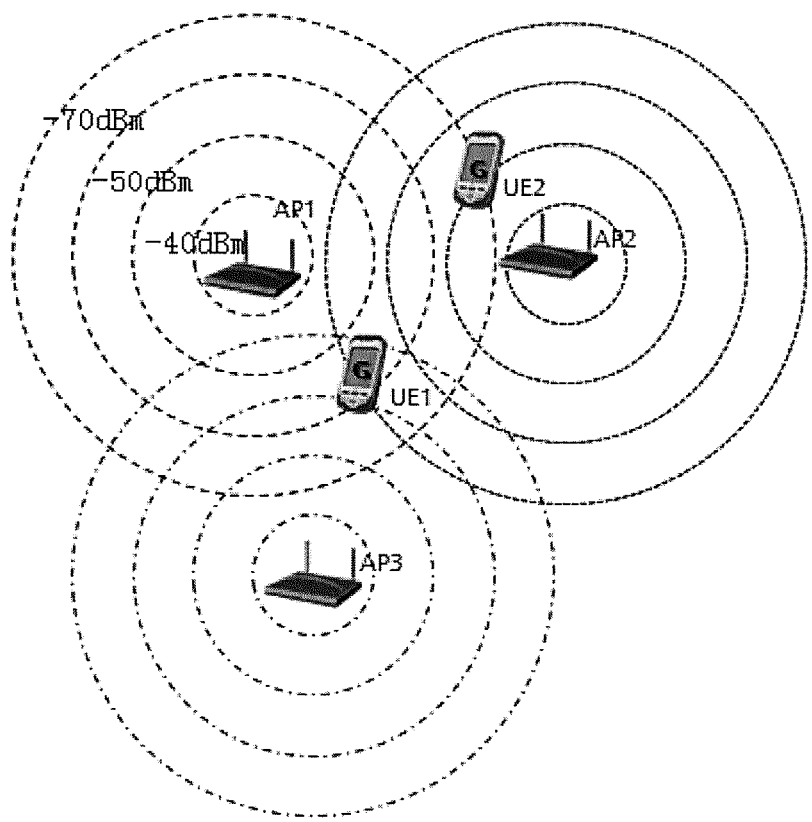
FIG. 2 is a schematic diagram of an application scenario of a method for collecting information about a wireless local area network access point according to an embodiment of the present invention.

With reference to FIG. 2, the following describes the WLAN AP information record collected and reported by the UE in the embodiment illustrated in FIG. 1. In FIG. 2, it is assumed that two UEs are distributed in coverage areas of three APs. Without loss of generality, identifiers of the two UEs are marked as UE1 and UE2 respectively, and SSIDs of the three APs are marked as AP1, AP2, and AP3 respectively. UE1 may find AP1, AP2, and AP3 and obtains three WLAN AP information records through recording. UE2 may find AP1 and AP2 and obtains two WLAN AP information records through recording.

Table-1 lists three WLAN AP information records collected and reported by user equipment UE1. Data in the table is exemplary data and does not constitute any limitation on this embodiment of the present invention.

TABLE 1

Examples of WLAN AP information records reported by user equipment UE1

| | | | |
|---|---|---|---|
| Collection Time | 2012 Nov. 7 11:57 | 2012 Nov. 7 11:57 | 2012 Nov. 7 11:57 |
| Geographic Location | 121.4206 31.0276 | 121.4206 31.0276 | 121.4206 31.0276 |
| Received Signal Power (dBm) | −50 | −50 | −75 |
| Deployer | Enterprise | Person | Operator |
| SSID | AP1 | AP3 | AP2 |
| MAC Address | 1C:AC:34:B5:54:45 | 21:A4:54:C5:F3:41 | E2:61:40:42:F7:10 |
| Encryption Type | WPA | WPA2 | WPA2 |
| Channel Number | 3 | 1 | 6 |
| Protocol Used | 802.11 g | 802.11 n | 802.11 n |

Table-2 lists two WLAN AP information records collected and reported by user equipment UE2. Data in the table is exemplary data, and formats and values of the data in the table do not constitute any limitation on this embodiment of the present invention.

By observing the data in Table-1 and Table-2 with reference to FIG. 2, it may be found that for a same WLAN AP, received signal power of different UEs in different locations directly relates to the distance between the UEs and the AP, and the shorter the distance is, the higher the received signal power is; and information about a WLAN AP collected by the different UEs is consistent. For multiple WLAN AP information records collected by a same UE, collection time and geographic locations are consistent.

If the UE collects multiple WLAN AP information records, the UE may send all the multiple WLAN AP information records to the base station, or may send only part of the WLAN AP information records to the base station, for example, sends only one or some WLAN AP information records that includes maximum received signal power; and the UE may send the multiple WLAN AP information records at a time or may send the multiple WLAN AP information records at multiple times.

TABLE 2

Examples of WLAN AP information records reported by user equipment UE2

| | | |
|---|---|---|
| Collection Time | 2012 Nov. 7 11:59 | 2012 Nov. 7 11:59 |
| Geographic Location | 121.4212 31.0279 | 121.4212 31.0279 |
| Received Signal Power (dBm) | −40 | −75 |
| Deployer | Operator | Enterprise |
| SSID | AP2 | AP1 |
| MAC Address | E2:61:40:42:F7:10 | 1C:AC:34:B5:54:45 |
| Encryption Type | WPA2 | WPA |
| Channel Number | 6 | 3 |
| Protocol Used | 802.11 n | 802.11 g |

In the optional technical solutions, based on architecture of a mobile communications network, status information of a UE that collects WLAN AP information may also be acquired when the WLAN AP information is collected. According to a combination of the collected WLAN AP information, received signal power for the UE to receive a WLAN AP signal, geographic location information of the UE, or collection time for the UE to collect the WLAN AP information, a running condition of the WLAN AP, such as network coverage and signal strength, may be learned. Further, the information may be used to optimize a WLAN, for example, optimize network coverage of the WLAN.

Figure 3:
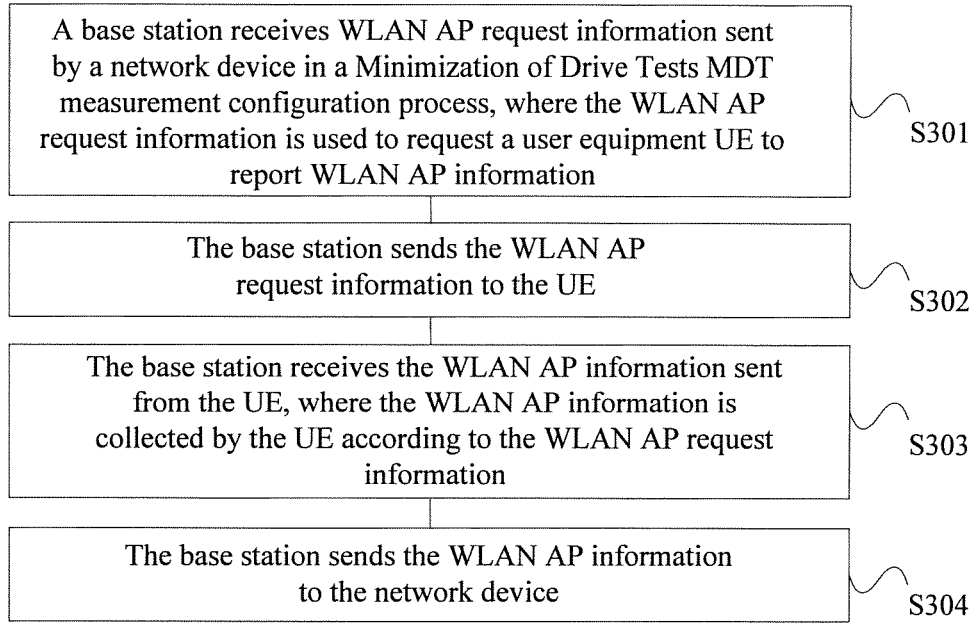
FIG. 3 is a schematic flowchart of a method for collecting information about a wireless local area network access point according to an embodiment of the present invention.

Referring to FIG. 3, a method provided in an embodiment of the present invention to collect information about a wireless local area network access point includes:

Step S301: A base station receives WLAN AP request information sent from a network device in a Minimization of Drive Tests MDT measurement configuration process, where the WLAN AP request information is used to request a user equipment UE to report WLAN AP information.

Step S302: The base station sends the WLAN AP request information to the UE.

Step S303: The base station receives the WLAN AP information sent from the UE, where the WLAN AP information is collected by the UE according to the WLAN AP request information.

Step S304: The base station sends the WLAN AP information to the network device.

The method for collecting information about a wireless local area network access point provided in the embodiment illustrated in FIG. 3 is consistent with the method provided in the embodiment illustrated in FIG. 1. The embodiment illustrated in FIG. 1 describes the method from the perspective of a user equipment, and the embodiment illustrated in FIG. 3 describes the method from the perspective of a base station. For related conceptual content, reference may be made to the descriptions in the embodiment illustrated in FIG. 1 and therefore no further details are provided herein again.

In the method for collecting information about a wireless local area network access point provided in the embodiment illustrated in FIG. 3, a UE may collect and report WLAN AP information based on architecture of a mobile communications network and by using an MDT measurement configuration process. In this way, WLAN AP information can be collected conveniently, accurately, and reliably.

Optionally, the receiving, by a base station, WLAN AP request information sent from a network device in a Minimization of Drive Tests MDT measurement configuration process may include: receiving, by the base station, an MDT measurement activation message sent from a network device, where the MDT measurement activation message includes the WLAN AP request information.

Optionally, the MDT measurement activation message may include MDT measurement indication information, which is used to instruct the base station to send a logged measurement configuration message or a radio resource control RRC connection reconfiguration message to a UE, and the logged measurement configuration message or the RRC connection reconfiguration message includes the WLAN AP request information. The network device may be a network management system device, a mobility management entity (mobility management entity, MME), or a serving general packet radio service (general packet radio service, GPRS) supporting node (serving GPRS support node, SGSN), or may be another network device that is capable of performing MDT measurement configuration. A type of the MDT measurement activation message relates to the network device that sends the MDT measurement activation message. For example, if the network device is a network management system device, the MDT measurement activation message may be a trace session activation request (trace session activation request) message; and if the network device is an MME, the MDT measurement activation message may be an initial context setup request (initial context setup request) message.

Optionally, the sending, by the base station, the WLAN AP request information to the user equipment UE in step S302 includes: sending, by the base station, a logged measurement configuration message to the UE according to the MDT measurement indication information, where the logged measurement configuration message includes the WLAN AP request information; or, sending, by the base station, an RRC connection reconfiguration message to the UE according to the MDT measurement indication information, where the RRC connection reconfiguration message includes the WLAN AP request information.

Optionally, the receiving, by the base station, the WLAN AP information sent from the UE in step S303 includes: receiving, by the base station, a WLAN AP information record sent from the UE, where the WLAN AP information record includes the WLAN AP information collected by the UE and status information of the UE recorded by the UE when collecting the WLAN AP information.

The sending, by the base station, the WLAN AP information to the network device in step S304 includes: sending, by the base station, the WLAN AP information record to the network device.

If the base station sends a logged measurement configuration message to the UE, the receiving, by the base station, a WLAN AP information record sent from the UE includes: receiving, by the base station, an MDT log sent from the UE, where the MDT log includes the WLAN AP information record; and the sending, by the base station, the WLAN AP information record to the network device includes: sending, by the base station, the MDT log to the network device.

If the base station sends a RRC connection reconfiguration message to the UE according to the MDT measurement indication information, the receiving, by the base station, a WLAN AP information record sent from the UE includes: receiving, by the base station, a measurement report sent from the UE, where the measurement report includes the WLAN AP information record; and the sending, by the base station, the WLAN AP information record to the network device includes: sending, by the base station, the measurement report to the network device.

The base station sends the WLAN AP information record to the network device, so that the network device may establish or update a WLAN AP information record database according to the WLAN AP information record.

In the optional technical solutions, based on architecture of a mobile communications network, status information of a UE that collects WLAN AP information may also be acquired when the WLAN AP information is collected. According to a combination of the collected WLAN AP information, received signal power for the UE to receive a WLAN AP signal, geographic location information of the UE, or collection time for the UE to collect the WLAN AP information, a running condition of the WLAN AP, such as network coverage and signal strength, may be learned. Further, the information may be used to optimize a WLAN, for example, optimize network coverage of the WLAN.

Figure 4:
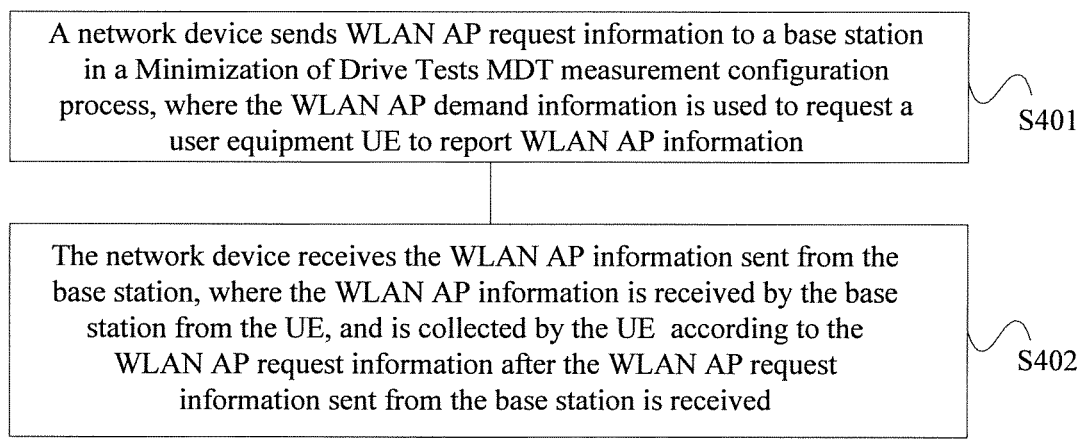
FIG. 4 is a schematic flowchart of a method for collecting information about a wireless local area network access point according to an embodiment of the present invention.

Referring to FIG. 4, a method provided in an embodiment of the present invention to collect information about a wireless local area network access point includes:

Step S401: A network device sends WLAN AP request information to a base station in a Minimization of Drive Tests MDT measurement configuration process, where the WLAN AP request information is used to request a user equipment UE to report WLAN AP information.

Step S402: The network device receives the WLAN AP information sent from the base station, where the WLAN AP information is received by the base station from the UE, and the WLAN AP information is collected by the UE according to the WLAN AP request information after the WLAN AP request information sent from the base station is received.

The method for collecting information about a wireless local area network access point provided in the embodiment illustrated in FIG. 4 is consistent with the methods provided in the embodiments illustrated in FIG. 1 and FIG. 3. The embodiments illustrated in FIG. 1 and FIG. 3 respectively describe the methods from the perspective of a user equipment and from the perspective of a base station, and the embodiment illustrated in FIG. 4 describes the method from the perspective of a network device. For related content, reference may be made to the descriptions in the embodiments illustrated in FIG. 1 and FIG. 3 and no further details are provided herein again. The network device may be a network management system device, a mobility management entity (mobility management entity, MME), or a serving general packet radio service (general packet radio service, GPRS) supporting node (serving GPRS support node, SGSN), or may be another network device that is capable of instructing a base station to perform MDT measurement.

In the method for collecting information about a wireless local area network access point provided in the embodiment illustrated in FIG. 4, a UE may collect and report WLAN AP information based on architecture of a mobile communications network and by using an MDT measurement configuration process. In this way, WLAN AP information can be collected conveniently, accurately, and reliably.

Optionally, the sending, by the network device, WLAN AP request information to a base station in a Minimization of Drive Tests MDT measurement configuration process in step S401 may include: sending, by the network device, an MDT measurement activation message to the base station, where the MDT measurement activation message includes the WLAN AP request information.

Optionally, the MDT measurement activation message further includes MDT measurement indication information, the MDT measurement indication information is used to instruct the base station to send a logged measurement configuration message or a radio resource control RRC connection reconfiguration message to a UE, and the logged measurement configuration message or the RRC connection reconfiguration message includes the WLAN AP request information.

Optionally, the receiving, by the network device, the WLAN AP information sent from the base station in step S402 may be as follows: receiving, by the network device, a WLAN AP information record sent from the base station, where the WLAN AP information record includes the WLAN AP information collected by the UE and status information of the UE recorded by the UE when collecting the WLAN AP information.

The receiving, by the network device, a WLAN AP information record sent from the base station includes:

if the base station sends a logged measurement configuration message to a UE, receiving, by the network device, an MDT log sent from the base station, where the MDT log includes the WLAN AP information record; or if the base station sends a RRC connection reconfiguration message to a UE, receiving, by the network device, a measurement report sent from the base station, where the measurement report includes the WLAN AP information record.

In the optional technical solutions, based on architecture of a mobile communications network, status information of a UE that collects WLAN AP information may also be acquired when the WLAN AP information is collected. According to a combination of the collected WLAN AP information, received signal power for the UE to receive a WLAN AP signal, geographic location information of the UE, or collection time for the UE to collect the WLAN AP information, a running condition of the WLAN AP, such as network coverage and signal strength, may be learned. Further, the information may be used to optimize a WLAN, for example, optimize network coverage of the WLAN.

Optionally, if the WLAN AP information record includes an MAC address of the WLAN AP, further, the method may further include:

Step S403: The network device establishes or updates a WLAN AP information record database according to the WLAN AP information record and by using the MAC address of the WLAN AP included in the WLAN AP information record as a search identifier.

When the network device receives a WLAN AP information record, the network device finds that an MAC address of a WLAN AP included in the WLAN AP information record is the search identifier and searches the WLAN AP information record database; if a same MAC address is not found, the network device adds a WLAN AP information record with the MAC address as a search identifier to the WLAN AP information record database; if a same MAC address is found, the network device adds the WLAN AP information record under the MAC address.

Assuming that the network device receives the WLAN AP information records listed in Table-1 and Table-2, the network device may establish a WLAN AP information record database shown in Table-3. Formats and data in Table-3 are merely exemplary and do not constitute any limitation on the WLAN AP information record database. It may be understood that a WLAN AP information record database of another form may also be constructed in specific implementation according to the WLAN AP information record.

If there are a relatively large number of WLAN AP information records in an established WLAN AP information record database, the network device may update the established WLAN AP information record database according to the received WLAN AP information record and by using an MAC address of the WLAN AP as a search identifier. Optionally, any one or multiple of the following update policies may be used:

For WLAN AP information records of multiple WLAN APs with different deployers in the established WLAN AP information record database:

a WLAN AP information record with an operator as a deployer is preferentially kept, and a WLAN AP information record with a person as a deployer is preferentially deleted.

TABLE 3

Examples of WLAN AP information record databases

| Search Identifier (MAC Address) | WLAN AP Informtion Record | Record 1 | Record 2 | Record 3 |
|---|---|---|---|---|
| 1C:AC:34:B5:54:45 | UE identifier | UE1 | UE2 | . . . |
| | Collection time | 2012 Nov. 7 11:57 | 2012 Nov. 7 11:59 | . . . |
| | Geographic location | 121.4206 31.0276 | 121.4212 31.0279 | . . . |
| | Received signal power (dBm) | −50 | −75 | . . . |
| | Deployer | Enterprise | Enterprise | . . . |
| | SSID | AP1 | AP1 | . . . |
| | Encryption type | WPA | WPA | . . . |
| | Channel number | 3 | 3 | . . . |
| | Protocol used | 802.11 g | 802.11 g | . . . |
| E2:61:40:42:F7:10 | UE identifier | UE1 | UE2 | . . . |
| | Collection time | 2012 Nov. 7 11:57 | 2012 Nov. 7 11:59 | . . . |
| | Geographic location | 121.4206 31.0276 | 121.4212 31.0279 | . . . |
| | Received signal power (dBm) | −75 | −40 | . . . |
| | Deployer | Operator | Operator | . . . |
| | SSID | AP2 | AP2 | . . . |
| | Encryption type | WPA2 | WPA2 | . . . |
| | Channel number | 6 | 6 | . . . |
| | Protocol used | 802.11 n | 802.11 n | . . . |
| 21:A4:54:C5:F3:41 | UE identifier | UE1 | | . . . |
| | Collection time | 2012 Nov. 7 11:57 | | . . . |
| | Geographic location | 121.4206 31.0276 | | . . . |
| | Received signal power (dBm) | −50 | | . . . |
| | Deployer | Person | | . . . |
| | SSID | AP3 | | . . . |
| | Encryption type | WPA2 | | . . . |
| | Channel number | 1 | | . . . |
| | Protocol used | 802.11 n | | . . . |
| . . . | . . . | . . . | . . . | . . . |

The update policy is considered based on the following: Operational reliability and stability of WLAN APs vary with deployers of the WLAN APs. Generally, reliability and stability of the WLAN APs deployed by an operator are the highest, those of the WLAN APs deployed by a person are the lowest, and those of the WLAN APs deployed by an enterprise or a school is between these two extremes. Therefore, different validity periods may be assigned to WLAN AP information records with different deployers. A validity period of a WLAN AP information record with an operator as the deployer is the longest, for example, a validity period of two years; a validity period of a WLAN AP information record with an enterprise or a school as the deployer is moderate, for example, a validity period of six months; and a validity period of a WLAN AP information record with a person as the deployer is the shortest, for example, a validity period of one month.

For WLAN AP information records of a same WLAN AP in the established WLAN AP information record database:

a WLAN AP information record with highest received signal power is preferentially kept, and a WLAN AP information record with lowest received signal power is preferentially deleted; or a WLAN AP information record in which geographic location information exists is preferentially kept, and a WLAN AP information record in which geographic location information does not exist is preferentially deleted; or a WLAN AP information record with latest collection time of WLAN AP information is preferentially kept, and a WLAN AP information record with earliest collection time of WLAN AP information is preferentially deleted.

The WLAN AP information record with the latest collection time indicates that the collection time of the WLAN AP information record is closest to the time for applying the update policy, that is, the WLAN AP information record is a newest WLAN AP information record of the WLAN AP; and the WLAN AP information record with the earliest collection time indicates that the collection time of the WLAN AP information record is most far away from the time for applying the update policy, that is, the WLAN AP information record is the oldest WLAN AP information record of the WLAN AP.

The WLAN AP information records with the highest received signal power, with the geographic location information, or with the latest collection time provide more useful references than other WLAN AP information records. For example, relatively high received signal power indicates that a distance between a UE that collects and reports the WLAN AP information record and the WLAN AP is the shortest, and geographic location information of the WLAN AP may be better estimated by using geographic location information of the UE.

Optionally, when the network device updates a WLAN AP information record database according to the received WLAN AP information record, and if the WLAN AP information record does not include the geographic location information of the UE, the method may further include:

Step S404: The network device determines the geographic location information of the UE according to the established WLAN AP information record database, where the established WLAN AP information record database includes at least one WLAN AP information record.

Optionally, the WLAN AP information record that does not include the geographic location information of the UE is recorded as a first WLAN AP information record, and the UE is a first UE; and the determining, by the network device, the geographic location information of the UE according to the established WLAN AP information record database may include:

searching the established WLAN AP information record database for a second WLAN AP information record by the network device by using an MAC address of a WLAN AP included in the first WLAN AP information record as a search identifier, where the second WLAN AP information record includes the MAC address and includes geographic location information of a second UE; and, if the second WLAN AP information record exists in the established WLAN AP information record database, determining, by the network device, the geographic location information of the second UE included in the second WLAN AP information record as geographic location information of the first UE.

Optionally, if multiple second WLAN AP information records exist, the network device selects a second WLAN AP information record with highest received signal power among the multiple second WLAN AP information records and determines the geographic location information of the second UE included in the second WLAN AP information record with the highest received signal power as the geographic location information of the first UE.

In the optional technical solutions, the network device may determine the geographic location information of the UE according to an established WLAN AP information record database. Because coverage of a WLAN AP is generally only 10 to 20 meters, locating precision of the technical solutions for determining geographic location information of a UE may reach 5 to 20 meters, and the solutions are still applicable to a situation that the UE is located in an indoor place and can overcome a limitation that a locating solution of a global navigation satellite system GNSS is applicable only to an outdoor situation in most cases.

If the network device also receives an MDT measurement result when receiving the first WLAN AP information record, and the MDT measurement result is obtained by the first UE through MDT measurement, the method may further include:

Step S405: The network device associates the MDT measurement result with the geographic location information of the first UE, where the geographic location information of the first UE is determined by the network device according to the established WLAN AP information record database.

By using the optional technical solutions, the MDT measurement result is associated with the geographic location information of the UE determined according to the established WLAN AP information record database, and optimization of a mobile communications network may be performed, for example, network coverage of the mobile communications network is optimized. In addition, convergence and interworking between a mobile communications network and a wireless local area network is promoted based on the WLAN AP information record and the MDT measurement result, for example, network coverage of the mobile communications network and the wireless local area network is fully considered.

Figure 5:
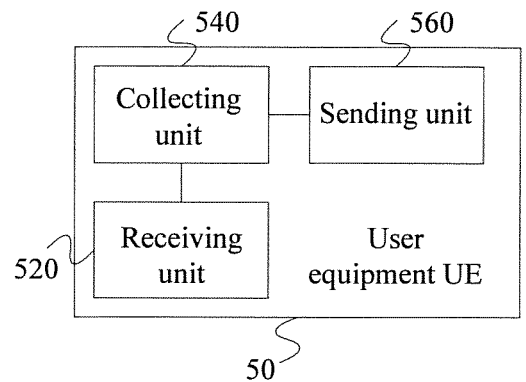
FIG. 5 is a schematic structural diagram of a user equipment according to an embodiment of the present invention.

Referring to FIG. 5, a user equipment UE 50 provided in an embodiment of the present invention includes a receiving unit 520, a sending unit 560, and a collecting unit 540 separately connecting to the receiving unit 520 and the sending unit 560.

The receiving unit 520 is configured to receive WLAN AP request information sent from a base station, where the WLAN AP request information is sent from a network device to the base station in a Minimization of Drive Tests MDT measurement configuration process, and the WLAN AP request information is used to request the UE to report WLAN AP information.

The collecting unit 540 is configured to collect WLAN AP information according to the WLAN AP request information.

The sending unit 560 is configured to send the WLAN AP information to the base station, so that the base station sends the WLAN AP information to the network device.

The user equipment UE 50 provided in the embodiment illustrated in FIG. 5 may be the UE in the embodiment illustrated in FIG. 1, FIG. 3, or FIG. 4. The foregoing method embodiments may be implemented by using the user equipment UE 50. For related content, reference may be made to the descriptions in the foregoing method embodiments and therefore no further details are provided herein again. The user equipment provided in the embodiment illustrated in FIG. 5 may collect and report WLAN AP information, based on architecture of a mobile communications network and by using an MDT measurement configuration process. In this way, WLAN AP information can be collected conveniently, accurately, and reliably.

Optionally, that the collecting unit 540 is configured to collect WLAN AP information according to the WLAN AP request information may include the following:

The collecting unit 540 is configured to perform a WLAN search according to the WLAN AP request information and record information about a specific WLAN AP among searched WLAN APs, where the specific WLAN AP includes a WLAN AP with a specific deployer or a WLAN AP with a specific service set identifier SSID.

Optionally, the collecting unit 540 is further configured to record status information of the UE when collecting the WLAN AP information, so as to obtain a WLAN AP information record, where the WLAN AP information record includes the WLAN AP information collected by the UE and the status information of the UE recorded by the UE when collecting the WLAN AP information; and that the sending unit 560 is configured to send the WLAN AP information to the base station may include the following: The sending unit 560 is configured to send the WLAN AP information record to the base station.

Optionally, that the receiving unit 520 is configured to receive WLAN AP request information sent from a base station may include the following: The receiving unit 520 is configured to receive a logged measurement configuration message sent from a base station, where the logged measurement configuration message includes the WLAN AP request information; and that the sending unit 560 is configured to send the WLAN AP information record to the base station includes the following: The sending unit 560 is configured to send an MDT log to the base station, where the MDT log includes the WLAN AP information record. The sending unit 560 is configured to send an MDT log available message to the base station before sending the MDT log to the base station; and the receiving unit 520 is configured to receive an MDT log request message sent from the base station before the sending unit 560 sends the MDT log to the base station.

Optionally, that the receiving unit 520 is configured to receive WLAN AP request information sent from a base station may include the following: The receiving unit 520 is configured to receive a radio resource control RRC connection reconfiguration message sent from a base station, where the RRC connection reconfiguration message includes the WLAN AP request information; and that the sending unit 560 is configured to send the WLAN AP information record to the base station may include the following: The sending unit 560 is configured to send a measurement report to the base station, where the measurement report includes the WLAN AP information record.

By using the user equipment UE provided in the optional technical solutions, based on architecture of a mobile communications network, status information of a UE that collects WLAN AP information may also be acquired when the WLAN AP information is collected. According to a combination of the collected WLAN AP information, received signal power for the UE to receive a WLAN AP signal, geographic location information of the UE, or collection time for the UE to collect the WLAN AP information, a running condition of the WLAN AP, such as network coverage and signal strength, may be learned. Further, the information may be used to optimize a WLAN, for example, optimize network coverage of the WLAN.

Figure 6:
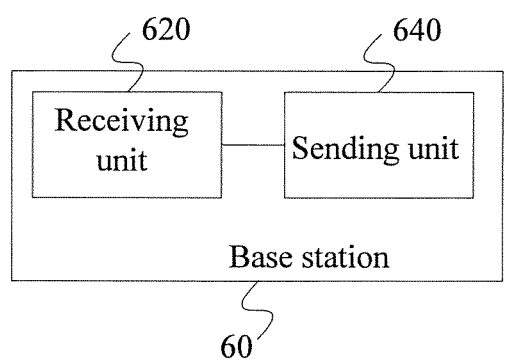
FIG. 6 is a schematic structural diagram of a base station according to an embodiment of the present invention.

Referring to FIG. 6, a base station 60 provided in an embodiment of the present invention includes:

a receiving unit 620, configured to receive WLAN AP request information sent from a network device in a Minimization of Drive Tests MDT measurement configuration process, where the WLAN AP request information is used to request a user equipment UE to report WLAN AP information; and a sending unit 640, configured to send the WLAN AP request information to the UE.

The receiving unit 620 may be configured to receive the WLAN AP information sent from the UE, where the WLAN AP information is collected by the UE according to the WLAN AP request information.

The sending unit 640 is configured to send the WLAN AP information to the network device.

The base station 60 provided in the embodiment illustrated in FIG. 6 may be the base station in the embodiment illustrated in FIG. 1, FIG. 3, or FIG. 4. The foregoing method embodiments may be implemented by using the base station 60. For related content, reference may be made to the descriptions in the foregoing method embodiments and therefore no further details are provided herein again. With the aid of the base station provided in the embodiment illustrated in FIG. 6, a UE may collect and report WLAN AP information based on architecture of a mobile communications network and by using an MDT measurement configuration process. In this way, WLAN AP information can be collected conveniently, accurately, and reliably.

Optionally, that the receiving unit 620 is configured to receive WLAN AP request information sent from a network device in an MDT measurement configuration process includes the following: The receiving unit 620 is configured to receive an MDT measurement activation message sent from the network device, where the MDT measurement activation message includes the WLAN AP request information.

Optionally, the MDT measurement activation message further includes MDT measurement indication information, the MDT measurement indication information is used to instruct the base station 60 to send a logged measurement configuration message or a radio resource control RRC connection reconfiguration message to a UE, and the logged measurement configuration message or the RRC connection reconfiguration message includes the WLAN AP request information.

Optionally, that the receiving unit 620 is configured to receive the WLAN AP information sent from the UE includes the following: The receiving unit 620 is configured to receive a WLAN AP information record sent from the UE, where the WLAN AP information record includes the WLAN AP information collected by the UE and status information of the UE recorded by the UE when collecting the WLAN AP information; and that the sending unit 640 is configured to send the WLAN AP information to the network device may include the following: The sending unit 640 is configured to send the WLAN AP information record to the network device.

Optionally, that the sending unit 640 is configured to send the WLAN AP request information to the UE includes the following: The sending unit 640 is configured to send the logged measurement configuration message to the UE according to the MDT measurement indication information; and that the receiving unit 620 is configured to receive a WLAN AP information record sent from the UE may include the following: The receiving unit 620 is configured to receive an MDT log sent from the UE, where the MDT log includes the WLAN AP information record; and that the sending unit 640 is configured to send the WLAN AP information record to the network device may include the following: The sending unit 640 is configured to send the MDT log to the network device.

Optionally, that the sending unit 640 is configured to send the WLAN AP request information to the UE includes the following: The sending unit 640 is configured to send the RRC connection reconfiguration message to the UE according to the MDT measurement indication information; and that the receiving unit 620 is configured to receive a WLAN AP information record sent from the UE may include the following: The receiving unit 620 is configured to receive a measurement report sent from the UE, where the measurement report includes the WLAN AP information record; and that the sending unit 640 is configured to send the WLAN AP information record to the network device may include the following: The sending unit 640 is configured to send the measurement report to the network device.

By using the base station provided in the optional technical solutions, based on architecture of a mobile communications network, status information of a UE that collects WLAN AP information may also be acquired when the WLAN AP information is collected. According to a combination of the collected WLAN AP information, received signal power for the UE to receive a WLAN AP signal, geographic location information of the UE, or collection time for the UE to collect the WLAN AP information, a running condition of the WLAN AP, such as network coverage and signal strength, may be learned. Further, the information may be used to optimize a WLAN, for example, optimize network coverage of the WLAN.

Figure 7:
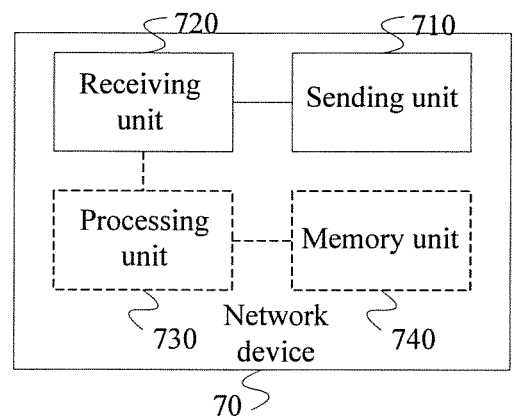
FIG. 7 is a schematic structural diagram of a network device according to an embodiment of the present invention.

Referring to FIG. 7, a network device 70 provided in an embodiment of the present invention includes:

a sending unit 710, configured to send WLAN AP request information to a base station in a Minimization of Drive Tests MDT measurement configuration process, where the WLAN AP request information is used to request a user equipment UE to report WLAN AP information; and A receiving unit 720, configured to receive the WLAN AP information sent from the base station, where the WLAN AP information is received by the base station from the UE, and the WLAN AP information is collected by the UE according to the WLAN AP request information after the WLAN AP request information sent from the base station is received.

The network device 70 illustrated in FIG. 7 may be the network device in the embodiment illustrated in FIG. 1, FIG. 3, or FIG. 4. The foregoing method embodiments may be implemented by using the network device 70. For related content, reference may be made to the descriptions in the foregoing method embodiments and therefore no further details are provided herein again. With the aid of the network device provided in the embodiment illustrated in FIG. 7, a UE may collect and report WLAN AP information based on architecture of a mobile communications network and by using an MDT measurement configuration process. In this way, WLAN AP information can be collected conveniently, accurately, and reliably.

Optionally, that the sending unit 710 is configured to send WLAN AP request information to a base station in an MDT measurement configuration process may include the following: The sending unit 710 is configured to send an MDT measurement activation message to a base station, where the MDT measurement activation message includes the WLAN AP request information. The MDT measurement activation message may include MDT measurement indication information, the MDT measurement indication information is used to instruct the base station to send a logged measurement configuration message or a radio resource control RRC connection reconfiguration message to a UE, and the logged measurement configuration message or the RRC connection reconfiguration message includes the WLAN AP request information.

Optionally, that the receiving unit 720 is configured to receive the WLAN AP information sent from the base station includes the following: The receiving unit 720 is configured to receive a WLAN AP information record sent from the base station, where the WLAN AP information record includes the WLAN AP information collected by the UE and status information of the UE recorded by the UE when collecting the WLAN AP information.

That the receiving unit 720 is configured to receive a WLAN AP information record sent from the base station may include the following: The receiving unit 720 is configured to receive an MDT log sent from the base station, where the MDT log includes the WLAN AP information record; or the receiving unit 720 is configured to receive a measurement report sent from the base station, where the measurement report includes the WLAN AP information record.

Optionally, the network device 70 may be a network management system device, a mobility management entity MME, or a serving general packet radio service supporting node SGSN, or may be another network device that is capable of instructing a base station to perform MDT measurement.

By using the network device provided in the optional technical solutions, based on architecture of a mobile communications network, status information of a UE that collects WLAN AP information may also be acquired when the WLAN AP information is collected. According to a combination of the collected WLAN AP information, received signal power for the UE to receive a WLAN AP signal, geographic location information of the UE, or collection time for the UE to collect the WLAN AP information, a running condition of the WLAN AP, such as network coverage and signal strength, may be learned. Further, the information may be used to optimize a WLAN, for example, optimize network coverage of the WLAN.

Optionally, the network device 70 may further include a processing unit 730 connecting to the receiving unit 720 and a memory unit 740 connecting to the processing unit 730.

The processing unit 730 is configured to, when the WLAN AP information record includes an MAC address of the WLAN AP, establish or update a WLAN AP information record database by using the MAC address as a search identifier.

The memory unit 740 is configured to store the WLAN AP information record database.

Optionally, the processing unit 730 is further configured to, if the WLAN AP information record does not include geographic location information of the UE, determine the geographic location information of the UE according to an established WLAN AP information record database when updating the WLAN AP information record database, where the established WLAN AP information record database includes at least one WLAN AP information record.

Optionally, the WLAN AP information record that does not include the geographic location information of the UE is recorded as a first WLAN AP information record, and the UE is a first UE; and that the processing unit 730 is further configured to determine geographic location information of the UE according to an established WLAN AP information record database may further include the following: The processing unit 730 is further configured to search the established WLAN AP information record database for a second WLAN AP information record by using an MAC address of a WLAN AP included in the first WLAN AP information record as a search identifier, where the second WLAN AP information record includes the MAC address and includes geographic location information of a second UE; and, if the second WLAN AP information record exists in the established WLAN AP information record database, determine the geographic location information of the second UE included in the second WLAN AP information record as geographic location information of the first UE.

By using the network device provided in the optional technical solutions, the geographic location information of the UE may be determined according to an established WLAN AP information record database. Because coverage of a WLAN AP is generally only 10 to 20 meters, locating precision of the technical solution for determining geographic location information of a UE may reach 5 to 20 meters, and the solution is still applicable to a situation that the UE is located in an indoor place and can overcome a limitation that a locating solution of a global navigation satellite system GNSS is only applicable to an outdoor situation in most cases.

Optionally, the processing unit 730 is further configured to, if the receiving unit 720 also receives an MDT measurement result when the receiving unit 720 receives the first WLAN AP information record, associate the MDT measurement result with the geographic location information of the first UE, where the geographic location information of the first UE is determined according to the established WLAN AP information record database, and the MDT measurement result is obtained by the first UE through MDT measurement.

By using the network device provided in the optional technical solutions, the MDT measurement result is associated with the geographic location information of the UE determined according to the established WLAN AP information record database, and optimization of a mobile communications network may be performed, for example, network coverage of the mobile communications network is optimized. In addition, convergence and interworking between a mobile communications network and a wireless local area network is promoted based on the WLAN AP information record and the MDT measurement result, for example, network coverage of the mobile communications network and the wireless local area network is fully considered.

Figure 8:
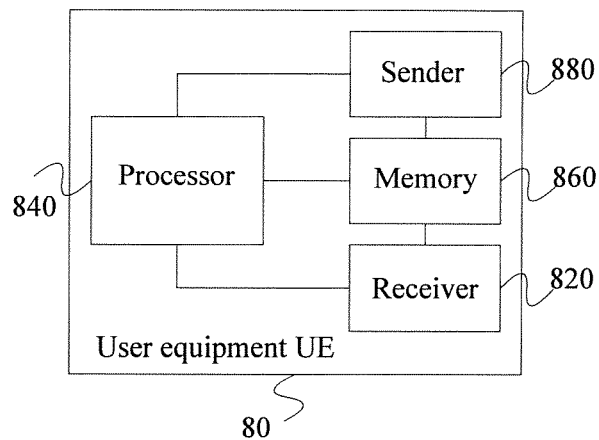
FIG. 8 is a schematic structural diagram of a user equipment according to an embodiment of the present invention.

Referring to FIG. 8, a user equipment UE 80 provided in an embodiment of the present invention includes: a receiver 820, a processor 840, a memory 860, and a sender 880.

The receiver 820 connects to the processor 840 and is configured to receive WLAN AP request information sent from a base station, where the WLAN AP request information is sent from a network device to the base station in a Minimization of Drive Tests MDT measurement configuration process, and the WLAN AP request information is used to request the UE to report WLAN AP information.

The processor 840 connects to the receiver 820, the memory 860, and the sender 880 separately and is configured to control, according to the WLAN AP request information, the receiver 820, the memory 860, and the sender 880 to collect and report WLAN AP information.

Optionally, the UE 80 may use a passive scanning (passive scanning) manner to acquire WLAN AP information, for example, the processor 840 may instruct, according to the WLAN AP request information, the receiver 820 to receive a broadcast beacon periodically sent from a WLAN AP and acquire information about a WLAN AP distributed around the UE from the broadcast beacon; or the UE 80 may also use an active scanning (active scanning) manner to acquire WLAN AP information, for example, the processor 840 may instruct, according to the WLAN AP request information, the sender 880 to broadcast a probe request (probe request) and acquire, according to a probe response received by the receiver 820, information about the WLAN AP distributed around the UE.

The memory 860 connects to the receiver 820, the sender 840, and the processor 840 and is configured to store the collected WLAN AP information.

The sender 880 connects to the processor 840 and the memory 860 and is configured to send the WLAN AP information to the base station.

The user equipment UE 80 provided in the embodiment illustrated in FIG. 8 may be the UE in the embodiment illustrated in FIG. 1, FIG. 3, or FIG. 4. The foregoing method embodiments may be implemented by using the user equipment UE 80. For related content, reference may be made to the descriptions in the foregoing method embodiments and therefore no further details are provided herein again. The user equipment provided in the embodiment illustrated in FIG. 8 may collect and report WLAN AP information, based on architecture of a mobile communications network and by using an MDT measurement configuration process. In this way, WLAN AP information can be collected conveniently, accurately, and reliably.

Optionally, that the processor 840 is configured to control, according to the WLAN AP request information, the receiver 820, the memory 860, and the sender 880 to collect and report WLAN AP information may include the following: The processor 840 is configured to record information about a specific WLAN AP in the acquired WLAN AP information, where the specific WLAN AP includes a WLAN AP with a specific deployer or a WLAN AP with a specific service set identifier SSID.

Optionally, the processor 840 may further be configured to record status information of the UE when collecting the WLAN AP information, so as to obtain a WLAN AP information record, where the WLAN AP information record includes the WLAN AP information collected by the UE and the status information of the UE recorded by the UE when collecting the WLAN AP information; and that the sender 880 is configured to send the WLAN AP information to the base station may include the following: The sender 880 is configured to send the WLAN AP information record to the base station.

Optionally, that the receiver 820 is configured to receive WLAN AP request information sent from a base station may include the following: The receiver 820 is configured to receive a logged measurement configuration message sent from a base station, where the logged measurement configuration message includes the WLAN AP request information; and that the sender 880 is configured to send the WLAN AP information record to the base station may include the following: The sender 880 is configured to send an MDT log to the base station, where the MDT log includes the WLAN AP information record. The sender 880 is configured to send an MDT log available message to the base station before sending the MDT log to the base station; and the receiver 820 is configured to receive an MDT log request message sent from the base station before the sender 880 sends the MDT log to the base station.

Optionally, that the receiver 820 is configured to receive WLAN AP request information sent from a base station may include the following: The receiver 820 is configured to receive a radio resource control RRC connection reconfiguration message sent from a base station, where the RRC connection reconfiguration message includes the WLAN AP request information; and that the sender 880 is configured to send the WLAN AP information record to the base station may include the following: The sender 880 is configured to send a measurement report to the base station, where the measurement report includes the WLAN AP information record.

By using the user equipment UE provided in the optional technical solutions, based on architecture of a mobile communications network, status information of a UE that collects WLAN AP information may also be acquired when the WLAN AP information is collected. According to a combination of the collected WLAN AP information, received signal power for the UE to receive a WLAN AP signal, geographic location information of the UE, or collection time for the UE to collect the WLAN AP information, a running condition of the WLAN AP, such as network coverage and signal strength, may be learned. Further, the information may be used to optimize a WLAN, for example, optimize network coverage of the WLAN.

Figure 9:
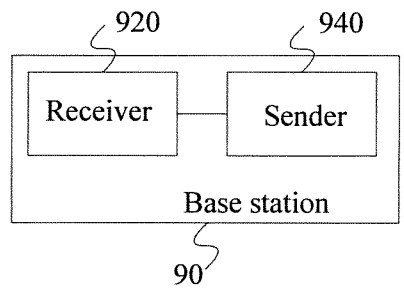
FIG. 9 is a schematic structural diagram of a base station according to an embodiment of the present invention.

Referring to FIG. 9, a base station 90 provided in an embodiment of the present invention includes:

a receiver 920, configured to receive WLAN AP request information sent from a network device in a Minimization of Drive Tests MDT measurement configuration process, where the WLAN AP request information is used to request a user equipment UE to report WLAN AP information; and a sender 940, configured to send the WLAN AP request information to the UE.

The receiver 920 is configured to receive the WLAN AP information sent from the UE, where the WLAN AP information is collected by the UE according to the WLAN AP request information.

The sender 940 is configured to send the WLAN AP information to the network device.

The base station 90 provided in the embodiment illustrated in FIG. 9 may be the base station in the embodiment illustrated in FIG. 1, FIG. 3, or FIG. 4. The foregoing method embodiments may be implemented by using the base station 90. For related content, reference may be made to the descriptions in the foregoing method embodiments and therefore no further details are provided herein again.

With the aid of the base station provided in the embodiment illustrated in FIG. 9, a UE may collect and report WLAN AP information based on architecture of a mobile communications network and by using an MDT measurement configuration process. In this way, WLAN AP information can be collected conveniently, accurately, and reliably.

Optionally, that a receiver 920 is configured to receive WLAN AP request information sent from a network device in an MDT measurement configuration process may include the following: The receiver 920 is configured to receive an MDT measurement activation message sent from the network device, where the MDT measurement activation message includes the WLAN AP request information.

Optionally, the MDT measurement activation message includes MDT measurement indication information, the MDT measurement indication information is used to instruct the base station 60 to send a logged measurement configuration message or a radio resource control RRC connection reconfiguration message to a UE, and the logged measurement configuration message or the RRC connection reconfiguration message includes the WLAN AP request information.

Optionally, that the receiver 920 is configured to receive the WLAN AP information sent from the UE includes the following: The receiver 920 is configured to receive a WLAN AP information record sent from the UE, where the WLAN AP information record includes the WLAN AP information collected by the UE and status information of the UE recorded by the UE when collecting the WLAN AP information; and that the sender 940 is configured to send the WLAN AP information to the network device may include the following: The sender 940 is configured to send the WLAN AP information record to the network device.

Optionally, that the sender 940 is configured to send the WLAN AP request information to the UE may include the following: The sender 940 is configured to send the logged measurement configuration message to the UE according to the MDT measurement indication information; and that the receiver 920 is configured to receive a WLAN AP information record sent from the UE may include the following: The receiver 920 is configured to receive an MDT log sent from the UE, where the MDT log includes the WLAN AP information record; and that the sender 940 is configured to send the WLAN AP information record to the network device may include the following: The sender 940 is configured to send the MDT log to the network device.

Optionally, that the sender 940 is configured to send the WLAN AP request information to the UE may include the following: The sender 940 is configured to send the RRC connection reconfiguration message to the UE according to the MDT measurement indication information; and that the receiver 920 is configured to receive a WLAN AP information record sent from the UE includes the following: The receiver 920 is configured to receive a measurement report sent from the UE, where the measurement report includes the WLAN AP information record; and that the sender 940 is configured to send the WLAN AP information record to the network device may include the following: The sender 940 is configured to send the measurement report to the network device.

By using the base station provided in the optional technical solutions, based on architecture of a mobile communications network, status information of a UE that collects WLAN AP information may also be acquired when the WLAN AP information is collected. According to a combination of the collected WLAN AP information, received signal power for the UE to receive a WLAN AP signal, geographic location information of the UE, or collection time for the UE to collect the WLAN AP information, a running condition of the WLAN AP, such as network coverage and signal strength, may be learned. Further, the information may be used to optimize a WLAN, for example, optimize network coverage of the WLAN.

Figure 10:
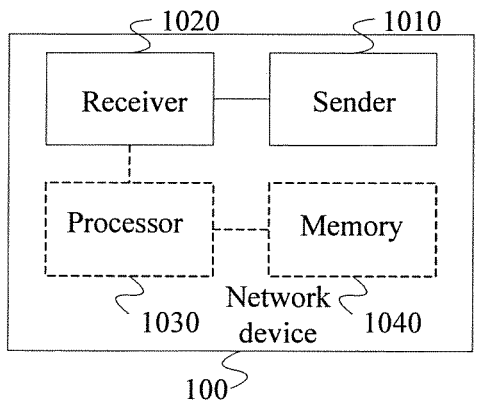
FIG. 10 is a schematic structural diagram of a network device according to an embodiment of the present invention.

Referring to FIG. 10, a network device 100 provided in an embodiment of the present invention includes:

a sender 1010, configured to send WLAN AP request information to a base station in an MDT measurement configuration process, where the WLAN AP request information is used to request a user equipment UE to report WLAN AP information; and a receiver 1020, configured to receive the WLAN AP information sent from the base station, where the WLAN AP information is received by the base station from the UE, and the WLAN AP information is collected by the UE according to the WLAN AP request information after the WLAN AP request information sent from the base station is received.

The network device 100 provided in the embodiment illustrated in FIG. 10 may be the network device in the embodiment illustrated in FIG. 1, FIG. 3, or FIG. 4. The foregoing method embodiments may be implemented by using the network device 100. For related content, reference may be made to the descriptions in the foregoing method embodiments and therefore no further details are provided herein again. With the aid of the network device provided in the embodiment illustrated in FIG. 10, a UE may collect and report WLAN AP information based on architecture of a mobile communications network and by using an MDT measurement configuration process. In this way, WLAN AP information can be collected conveniently, accurately, and reliably.

Optionally, that the sender 1010 is configured to send WLAN AP request information to a base station in an MDT measurement configuration process may include the following: The sender 1010 is configured to send an MDT measurement activation message to the base station, where the MDT measurement activation message includes the WLAN AP request information. The MDT measurement activation message may further include MDT measurement indication information, the MDT measurement indication information is used to instruct the base station to send a logged measurement configuration message or a radio resource control RRC connection reconfiguration message to a UE, and the logged measurement configuration message or the RRC connection reconfiguration message includes the WLAN AP request information.

Optionally, that the receiver 1020 is configured to receive the WLAN AP information sent from the base station includes the following: The receiver 1020 is configured to receive a WLAN AP information record sent from the base station, where the WLAN AP information record includes the WLAN AP information collected by the UE and status information of the UE recorded by the UE when collecting the WLAN AP information.

That the receiver 1020 is configured to receive a WLAN AP information record sent from the base station may include the following: The receiver 1020 is configured to receive an MDT log sent from the base station, where the MDT log includes the WLAN AP information record; or the receiver 1020 is configured to receive a measurement report sent from the base station, where the measurement report includes the WLAN AP information record.

Optionally, the network device 100 may be a network management system device, a mobility management entity MME, or a serving general packet radio service supporting node SGSN, or may be another network device that is capable of instructing a base station to perform MDT measurement.

By using the network device provided in the optional technical solutions, based on architecture of a mobile communications network, status information of a UE that collects WLAN AP information may also be acquired when the WLAN AP information is collected. According to a combination of the collected WLAN AP information, received signal power for the UE to receive a WLAN AP signal, geographic location information of the UE, or collection time for the UE to collect the WLAN AP information, a running condition of the WLAN AP, such as network coverage and signal strength, may be learned. Further, the information may be used to optimize a WLAN, for example, optimize network coverage of the WLAN.

Optionally, the network device 100 may further include a processor 1030 connecting to the receiver 1020 and a memory 1040 connecting to the processor 1030.

The processor 1030 is configured to establish or update a WLAN AP information record database according to the WLAN AP information record and by using an MAC address of a WLAN AP included in the WLAN AP information record as a search identifier.

The memory 1040 is configured to store the WLAN AP information record database.

Optionally, the processor 1030 is further configured to, if the WLAN AP information record does not include geographic location information of the UE, determine the geographic location information of the UE according to an established WLAN AP information record database when updating the WLAN AP information record database, where the established WLAN AP information record database includes at least one WLAN AP information record.

That the processor 1030 is further configured to determine the geographic location information of the UE according to an established WLAN AP information record database may further include the following: The processor 1030 is configured to search the established WLAN AP information record database for a second WLAN AP information record by using an MAC address of a WLAN AP included in the WLAN AP information record as a search identifier, where the second WLAN AP information record includes the MAC address and includes geographic location information of the second UE; and, if the second WLAN AP information record exists in the WLAN AP information record database, determine the geographic location information of the second UE included in the second WLAN AP information record as the geographic location information of the UE.

By using the network device provided in the optional technical solutions, the geographic location information of the UE may be determined according to an established WLAN AP information record database. Because coverage of a WLAN AP is generally only 10 to 20 meters, locating precision of the technical solutions for determining geographic location information of a UE may reach 5 to 20 meters, and the solutions are still applicable to a situation that the UE is located in an indoor place and can overcome a limitation that a locating solution of a global navigation satellite system GNSS is only applicable to an outdoor situation in most cases.

Optionally, the processor 1030 is further configured to, if the receiver 1020 also receives an MDT measurement result when the receiver 1020 receives the WLAN AP information record, associate the MDT measurement result with the geographic location information of the UE, where the geographic location information of the UE is determined according to an established WLAN AP information record database, and the MDT measurement result is obtained by the UE through MDT measurement.

By using the network device provided in the optional technical solutions, the MDT measurement result is associated with the geographic location information of the UE determined according to the established WLAN AP information record database, and optimization of a mobile communications network may be performed, for example, network coverage of the mobile communications network is optimized. In addition, convergence and interworking between a mobile communications network and a wireless local area network is promoted based on the WLAN AP information record and the MDT measurement result, for example, network coverage of the mobile communications network and the wireless local area network is fully considered.

Figure 11:
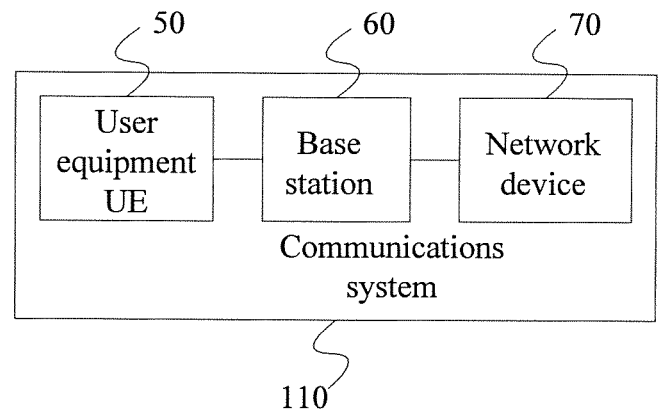
FIG. 11 is a schematic structural diagram of a communications system according to an embodiment of the present invention.

Referring to FIG. 11, a communications system 110 provided in an embodiment of the present invention includes: the user equipment UE 50 in the embodiment illustrated in FIG. 5, the base station 60 in the embodiment illustrated in FIG. 6, and the network device 70 in the embodiment illustrated in FIG. 7.

The network device 70 is configured to send WLAN AP request information to the base station 60 in a Minimization of Drive Tests MDT measurement configuration process, where the WLAN AP request information is used to request the UE 50 to report WLAN AP information.

The base station 60 is configured to send the WLAN AP request information to the UE 50.

The UE 50 is configured to collect WLAN AP information according to the WLAN AP request information and report the WLAN AP information to the base station 60.

The base station 60 is configured to receive the WLAN AP information sent from the UE and send the WLAN AP information to the network device 70.

The network device 70 is configured to receive the WLAN AP information sent from the base station.

Figure 12:
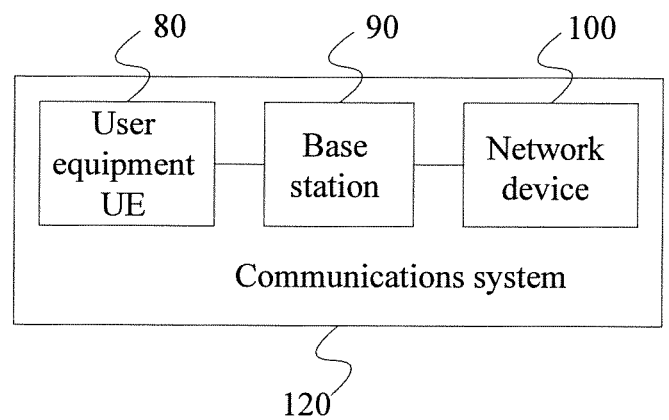
FIG. 12 is a schematic structural diagram of another communications system according to an embodiment of the present invention.

Referring to FIG. 12, a communications system 120 provided in an embodiment of the present invention includes: the user equipment UE 80 in the embodiment illustrated in FIG. 8, the base station 90 in the embodiment illustrated in FIG. 9, and the network device 100 in the embodiment illustrated in FIG. 10.

The network device 100 is configured to send WLAN AP request information to the base station 90 in a Minimization of Drive Tests MDT measurement configuration process, where the WLAN AP request information is used to request the UE 80 to report WLAN AP information.

The base station 90 is configured to send the WLAN AP request information to the UE 80.

The UE 80 is configured to collect WLAN AP information according to the WLAN AP request information and report the WLAN AP information to the base station 90.

The base station 90 is configured to receive the WLAN AP information sent from the UE and send the WLAN AP information to the network device 100.

The network device 100 is configured to receive the WLAN AP information sent from the base station.

In the communications system provided in the embodiment illustrated in FIG. 11 or FIG. 12, a UE may collect and report WLAN AP information based on architecture of a mobile communications network and by using an MDT measurement configuration process. In this way, WLAN AP information can be collected conveniently, accurately, and reliably.

A person skilled in the art can understand that various illustrative logical blocks (illustrative logic block) and steps (step) that are listed in the embodiments of the present invention may be implemented by using electronic hardware, computer software, or a combination of the two. For the purpose of clearly displaying interchangeability (interchangeability) of hardware and software, functions of the foregoing various illustrative components (illustrative components) and steps have been generally described. Whether such functions are implemented by using hardware or software depends on a particular application and a design requirement of the entire system. A person skilled in the art may use various methods to implement the functions for each particular application, but it should not be considered that such implementation goes beyond the protection scope of the embodiments of the present invention.

The various illustrative logical blocks, modules, and circuits described in the embodiments of the present invention may implement or operate the described functions by using a design of a general processor, a digital signal processor, an application-specific integrated circuit (ASIC), a field programmable gate array (FPGA) or another programmable logical apparatus, a discrete gate or transistor logic, a discrete hardware component, or any combination thereof. The general processor may be a microprocessor. Optionally, the general processor may also be any traditional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of the present invention may be directly embedded into hardware, a software module executed by a processor, or a combination of the two. The software module may be stored in a RAM memory, a flash memory, a ROM memory, an EPROM memory, an EEPROM memory, a register, a hard disk, a removable magnetic disk, an optical disc, or a storage medium of any other form in the art. Exemplarily, the storage medium may connect to a processor so that the processor may read information from the storage medium and write information to the storage medium. Optionally, the storage medium may also be integrated into a processor. The processor and the storage medium may be arranged in the ASIC, and the ASIC may be arranged in a user terminal. Alternatively, the processor and the storage medium may also be arranged in different components of the user terminal.

In one or more exemplary designs, the functions described in the embodiments of the present invention may be implemented by using hardware, software, firmware, or any combination of the three. If being implemented by the software, these functions may be stored on a computer-readable medium or are transmitted to the computer-readable medium in a form of one or more instructions or code. The computer-readable medium includes a computer storage medium and a communications medium that enables a computer program to move from one place to another place. The storage medium may be an available medium that may be accessed by any general or special computer. For example, such computer-readable medium may include but is not limited to a RAM, a ROM, an EEPROM, an optical disc or another compact disk storage, a disk storage or another magnetic storage apparatus, or any other medium that may be used to bear or store program code, where the program code is in a form of an instruction or a data structure or in a form that can be read by the general or special computer or the general or special processor. In addition, any connection may be appropriately defined as the computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the defined computer-readable medium. The disc (disk) and the disk (disc) include a compressed disk, a laser disk, an optical disc, a DVD, a diskette, and a blue-ray disk. The disk generally copies data by a magnetic means, and the disc generally copies data optically by a laser means. The foregoing combination may also be included in the computer-readable medium.

According to the foregoing description of this specification in the present invention, technologies in the art may use or implement the content of the present invention. Any modification based on the disclosed content shall be considered to be obvious in the art. The basic principles described in the present invention may apply to other variations without departing from the essence and scope of the present invention. Therefore, the content disclosed in the present invention is not limited to the described embodiments and designs but may also be extended to a maximum scope that is consistent with the principles and disclosed new features of the present invention.

What is claimed is:

1. A method for collecting information about a wireless local area network (WLAN) access point (AP), the method comprising:
    receiving, by a user equipment (UE), WLAN AP request information from a base station in a Minimization of Drive Tests (MDT) measurement configuration process, the WLAN AP request information for requesting the UE to report WLAN AP information;
    performing, by the UE, a WLAN search according to the WLAN AP request information and recording WLAN AP information about a specific WLAN AP among searched WLAN APs, wherein the specific WLAN AP comprises a WLAN AP with a specific deployer or a specific service set identifier (SSID); and
    sending, by the UE, the WLAN AP information to the base station.

2. The method according to claim 1,
    wherein the specific WLAN AP comprises a WLAN AP with a specific deployer.

3. The method according to claim 1,
    wherein the specific WLAN AP comprises a WLAN AP with a specific service set identifier (SSID).

4. The method according to claim 1, wherein receiving, by a UE, WLAN AP request information from a base station comprises:
    receiving, by the UE, a logged measurement configuration message from a base station, wherein the logged measurement configuration message comprises the WLAN AP request information.

5. The method according to claim 1, wherein receiving, by a UE, WLAN AP request information from a base station comprises:
    receiving, by the UE, a radio resource control (RRC) connection reconfiguration message from a base station, wherein the RRC connection reconfiguration message comprises the WLAN AP request information.

6. The method according to claim 1, further comprising:
    recording, by the UE, status information of the UE when recording the WLAN AP information; and
    sending, by the UE, the status information of the UE to the base station.

7. The method according to claim 6, wherein the status information of the UE recorded by the UE comprises one or multiple types of the following information:
    received signal power for the UE to receive a WLAN AP signal, geographic location information of the UE, or time the UE recorded the WLAN AP information.

8. The method according to claim 1, wherein the WLAN AP information recorded by the UE comprises one or multiple types of the following information:
    a media access control (MAC) address, a service set identifier (SSID), an encryption type, a channel number, a protocol used, or a deployer.

9. A user equipment (UE), comprising:
    a receiver, configured to receive WLAN AP request information from a base station in a Minimization of Drive Tests (MDT) measurement configuration process, the WLAN AP request information for requesting the UE to report WLAN AP information;
    a processor, configured to perform a WLAN search according to the WLAN AP request information and record WLAN AP information about a specific WLAN AP among searched WLAN APs, wherein the specific WLAN AP comprises a WLAN AP with a specific deployer or a specific service set identifier (SSID); and
    a sender, configured to send the WLAN AP information to the base station.

10. The UE according to claim 9,
    wherein the specific WLAN AP comprises a WLAN AP with a specific deployer.

11. The UE according to claim 9,
    wherein the specific WLAN AP comprises a WLAN AP with a specific service set identifier (SSID).

12. The UE according to claim 9, wherein the receiver is further configured to:
    receive a logged measurement configuration message from a base station, wherein the logged measurement configuration message comprises the WLAN AP request information.

13. The UE according to claim 9, wherein the receiver is further configured to:
    receive a radio resource control (RRC) connection reconfiguration message from a base station, wherein the RRC connection reconfiguration message comprises the WLAN AP request information.

14. The UE according to claim 9, wherein the processor is further configured to:
    record status information of the UE when recording the WLAN AP information, and send the status information of the UE to the base station.

15. The UE according to claim 14, wherein the status information of the UE recorded by the UE when collecting the WLAN AP information comprises one or multiple types of the following information:
    received signal power for the UE to receive a WLAN AP signal, geographic location information of the UE, or time the UE recorded the WLAN AP information.

16. The UE according to claim 9, wherein the WLAN AP information recorded by the UE comprises one or multiple types of the following information:
    a media access control (MAC) address, a service set identifier (SSID), an encryption type, a channel number, a protocol used, or a deployer.

* * * * *